(12) United States Patent
Harada

(10) Patent No.: US 10,919,476 B2
(45) Date of Patent: Feb. 16, 2021

(54) PRE-CRASH CONTROL DEVICE AND CONTROL METHOD OF PRE-CRASH CONTROL DEVICE

(71) Applicant: TOYOTA JIDOSHA KABUSHIKI KAISHA, Toyota (JP)

(72) Inventor: Tomoaki Harada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 115 days.

(21) Appl. No.: 16/050,785

(22) Filed: Jul. 31, 2018

(65) Prior Publication Data

US 2019/0111874 A1 Apr. 18, 2019

(30) Foreign Application Priority Data

Oct. 18, 2017 (JP) .................. 2017-202154

(51) Int. Cl.
*B60R 21/01* (2006.01)
*B60R 21/0134* (2006.01)
(Continued)

(52) U.S. Cl.
CPC ......... *B60R 21/0134* (2013.01); *B60W 30/09* (2013.01); *B60W 30/0956* (2013.01);
(Continued)

(58) Field of Classification Search
CPC ............. B60R 21/0134; B60R 21/0132; G01S 13/726; G01S 13/931; G01S 13/588; G01S 13/589; G01S 13/42; G01S 2013/9353; G01S 2013/9375; G01S 2013/932; G01S 2013/93271; G08G 1/166; B60W 30/0956; B60W 30/09; B60W 2050/0022; B60W 2420/52; B60W 2520/28; B60W 2750/30; B60W 2520/14; B60W 2754/10;
(Continued)

(56) References Cited

U.S. PATENT DOCUMENTS 10,672,275 B2* 6/2020 Minemura ......... B60K 31/0008
2019/0346557 A1* 11/2019 Baba ........................ G01S 13/86

FOREIGN PATENT DOCUMENTS

JP 2009-168624 A 7/2009
JP 2009-173121 A 8/2009
(Continued)

*Primary Examiner* — Michael V Kerrigan
(74) *Attorney, Agent, or Firm* — Hunton Andrews Kurth LLP

(57) ABSTRACT

A pre-crash control device includes target information acquisition units and an electric control unit configured to update a recognized position based on an acquired position each time target information is newly acquired, to estimate a moving direction based on history of the recognized position, to determine whether a collision probability is high based on the recognized position and the moving direction, and to perform pre-crash control if it is determined that the collision probability is high and a time to collision becomes equal to or smaller than a threshold execution time. The electric control unit is configured to update the recognized position based on a currently predicted position and on the acquired position and to update the recognized position to the acquired position when the time to collision becomes equal to or smaller than a first threshold switching time.

4 Claims, 11 Drawing Sheets

(51) Int. Cl.
*B60W 30/095* (2012.01)
*B60W 30/09* (2012.01)
*G01S 13/72* (2006.01)
*G01S 13/931* (2020.01)
*G01S 13/58* (2006.01)
*G08G 1/16* (2006.01)
*G01S 13/42* (2006.01)
*B60W 50/00* (2006.01)

(52) U.S. Cl.
CPC ............ *G01S 13/42* (2013.01); *G01S 13/588* (2013.01); *G01S 13/589* (2013.01); *G01S 13/726* (2013.01); *G01S 13/931* (2013.01); *G08G 1/166* (2013.01); *B60W 2050/0022* (2013.01); *B60W 2420/52* (2013.01); *B60W 2520/14* (2013.01); *B60W 2520/28* (2013.01); *B60W 2754/10* (2020.02); *G01S 2013/932* (2020.01); *G01S 2013/93271* (2020.01)

(58) Field of Classification Search
CPC ... B60W 2554/4045; B60W 2554/804; B60W 2554/802; B60W 30/0953; B60Q 9/008; B60T 7/12; B60T 8/172
See application file for complete search history.

(56) References Cited

FOREIGN PATENT DOCUMENTS

JP 2011-204124 A 10/2011
JP 2014-149741 A 8/2014

\* cited by examiner

PRE-CRASH CONTROL DEVICE AND CONTROL METHOD OF PRE-CRASH CONTROL DEVICE

INCORPORATION BY REFERENCE

The disclosure of Japanese Patent Application No. 2017-202154 filed on Oct. 18, 2017 including the specification, drawings and abstract is incorporated herein by reference in its entirety.

BACKGROUND

1. Technical Field

The present disclosure relates to a pre-crash control device and a control method of a pre-crash control device that perform pre-crash control when there is a high probability that a target detected by a target detection unit will collide with the host vehicle and, in addition, the time to collision of the target becomes equal to or smaller than the threshold execution time.

2. Description of Related Art

As proposed in Japanese Patent Application Publication No. 2014-149741 (JP 2014-149741 A), there is known a pre-crash control device that performs pre-crash control when the Time To Collision (TTC), which indicates the time that will elapse before a target (approaching object) collides the host vehicle, becomes equal to or smaller than the threshold time. This pre-crash control includes alarm output control and brake control for avoiding collision between the host vehicle and the target.

More specifically, in order to stabilize the position of a target chronologically, the device described in Japanese Patent Application Publication No. 2014-149741 (JP 2014-149741 A) recognizes the position of a detected target by performing the time-series filter processing for the position of the target. That is, the device described in Japanese Patent Application Publication No. 2014-149741 (JP 2014-149741 A) uses the time series filter to chronologically smooth the "position of a detected target" for recognizing the smoothed position as the position of the target.

A pre-crash control device that recognizes the position of a target using a filter based on an $\alpha\beta$ filter method, which is one type of the time-series filter described above, is known (see Japanese Patent Application Publication No. 2009-168624 (JP 2009-168624 A)). In the $\alpha\beta$ filter method, each time the sampling interval elapses, the smoothed position is calculated by weighting the predicted position of a target and the actually observed acquired position at the ratio of $1-\alpha:\alpha$. Furthermore, as the predicted position, the position moved from the last smoothed position at the last-calculated smoothed speed for length of the sampling interval is calculated. In the $\alpha\beta$ filter method, the current smoothed speed is calculated by correcting the last smoothed speed by the ratio of $\beta$ of the "residual error between the predicted position and the acquired position".

In addition, the pre-crash control device described in Japanese Patent Application Publication No. 2009-168624 (JP 2009-168624 A) estimates the moving direction of a target by using the history of the recognized position of a target and the least squares method.

SUMMARY

A pre-crash control device using a filter based on the $\alpha\beta$ filter method, such as the one described in Japanese Patent Application Publication No. 2009-168624 (JP 2009-168624 A), recognizes the smoothed position, which is based on the predicted position and the acquired position, as the position of a target. Therefore, as the number of recognitions increases, there is a probability that the deviation of the recognized position from the acquired position is increased. For example, if the acquired position is continuously detected in one of the left direction and the right direction of the predicted position and if the X component (component in the vehicle width direction) of the last calculated smoothed speed indicates that the currently predicted position is further moved away from the currently acquired position, the deviation of the recognized position from the acquired position increases proportionally to an increase in the number of recognitions until the X component of the last calculated smoothed speed indicates that the currently predicted position becomes closer to the currently acquired position.

Such a pre-crash control device generally determines whether a target will collide with the host vehicle under the assumption that the target will move from the recognized position along the movement direction. Therefore, if the recognized position deviates largely from the acquired position, the probability of collision between a target and the host vehicle may not be determined accurately.

The present disclosure provides a pre-crash control device and a control method of a pre-crash control device capable of reducing a decrease in the accuracy of collision determination.

A first aspect of the present disclosure is a pre-crash control device (hereinafter also referred to as the "device according to the present disclosure"). The pre-crash control device includes target information acquisition units each of which is configured to acquire target information that can identify a position of a target with respect to a host vehicle each time a predetermined time elapses; and an electric control unit configured to update a recognized position based on an acquired position each time the target information is newly acquired. The recognized position is a position of the target used for estimating a moving direction of the target. The acquired position is a position of the target identified by the newly acquired target information. The electric control unit is configured to estimate the moving direction of the target based on history of the recognized position. The electric control unit is configured to determine whether a collision probability is high based on the recognized position and the moving direction. The collision probability is a probability that the target will collide with the host vehicle. The electric control unit is configured to perform pre-crash control in order to avoid collision with the target when the electric control unit determines that the collision probability is high and a time to collision becomes equal to or smaller than a threshold execution time. The time to collision is a time for the target to collide with the host vehicle.

The electric control unit is configured to estimate a currently predicted position of the target based on the recognized position last updated, to update the recognized position based on the currently predicted position and the acquired position, and to update the recognized position to the acquired position when the time to collision becomes equal to or smaller than a predetermined first threshold switching time.

Even if a target moves in uniform linear motion, the acquired position tends to vary with respect to a certain straight line and, therefore, there is a variation in the history of the acquired position with the result that the moving direction of the target point estimated at each time point is more likely to change greatly. In such a case, even if there is a variation in the acquired position, updating the recognized position of the target based on the predicted position and the acquired position is more likely to decrease the variation in the recognized position. Updating the recognized position of the target in this way decreases the probability that the moving direction of the target will change greatly and, as a result, stabilizes the moving direction chronologically. This update method also prevents a decrease in the collision determination accuracy in a case in which, due to a great change in the moving direction, the probability of collision between a target and the host vehicle is determined to be high at a certain point in time and is determined to be low at the next point in time.

The predicted position is sometimes predicted gradually in a direction that is further away from the acquired position. In such a case, there is a probability that the deviation of the recognized position from the acquired position becomes larger as the number of recognitions increases. The device according to the present disclosure updates the recognized position to the acquired position when the time to collision of the target becomes equal to or smaller than the first threshold switching time. This allows the above-described deviation of the recognized position from the acquired position to be reset. Furthermore, when the time to collision of the target becomes equal to or smaller than the first threshold switching time, the distance between the target point and the host vehicle is relatively small. In this case, because the error of the acquired position with respect to the actual position of the target is small, the recognized position updated to the acquired position is corrected to the actual position. In this way, the device according to the present disclosure can prevent a degradation in the accuracy of collision determination caused by a deviation of the recognized position from the acquired position, thus reducing the probability that unnecessary pre-crash control is performed for a target that will not collide with the host vehicle and the probability that necessary pre-crash control is not performed for a target that will collide with the host vehicle.

In the above aspect, when the time to collision of the target becomes equal to or smaller than the first threshold switching time and the target information is newly acquired after the recognized position is updated to the acquired position, the electric control unit may update the recognized position based on the predicted position and the acquired position.

The recognized position is updated based on the predicted position and the acquired position if the time to collision becomes equal to or smaller than the first threshold switching time and the recognized position is updated to the acquired position. This update method decreases the probability that the moving direction of the target changes greatly, allowing the moving direction to be stabilized chronologically.

In the above aspect, the electric control unit may update the recognized position to a position determined by weighted averaging a position of the target and the acquired position if the time to collision of the target becomes equal to or smaller than a second threshold switching time that is larger than the first threshold switching time. The position of the target may be calculated based on the predicted position and the acquired position. The electric control unit may perform the weighted averaging in such a way that the recognized position becomes gradually closer to the acquired position as the time to collision becomes closer to the first threshold switching time.

As a result, the recognized position is set to a position determined by the weighted average in such a way that the recognized position gradually becomes closer to the acquired position from the time the time to collision becomes equal to or smaller than the second threshold switching time. Therefore, even when the time to collision becomes equal to or smaller than the first threshold switching time and, as a result, the recognized position is updated to the acquired position, this update method prevents the recognized position from being changed suddenly from the past recognized position.

In the above aspect, the pre-crash control device may further include a vehicle speed detection unit configured to detect a vehicle speed of the host vehicle. The electric control unit may update a recognized speed each time the target information is newly acquired, based on the recognized speed and on a speed based on a difference between the acquired position and the predicted position. The recognized speed may be a last updated speed of the target. The electric control unit may determine whether there is a probability that the target collides with the host vehicle based on a difference between a first time and a second time. The first time may be a time required for the host vehicle to arrive at a collision predicted intersection point when the host vehicle travels along a predicted course predicted along which the host vehicle is to travel at a vehicle speed detected by the vehicle speed detection unit. The collision predicted intersection point may be an intersection point between an estimated course extending from the recognized position in the moving direction and the predicted course. The second time may be a time required for the target to arrive at the collision predicted intersection point from the recognized position when the target moves along the moving direction at the recognized speed.

As a result, it is determined whether there is a probability that the target will collide with the host vehicle based on the difference between the first time required for the host vehicle to arrive at the collision predicted intersection point" and the "second time required for the target to arrive at the collision predicted intersection point. This makes it possible to more accurately determine whether there is a probability that the target will collide with the host vehicle.

In the above aspect, the electric control unit may set, in advance, a first threshold execution time and a second threshold execution time that is larger than the first threshold execution time. The electric control unit may perform first pre-crash control as the pre-crash control when the electric control unit determines that the collision probability is high and the time to collision is equal to or smaller than the first threshold execution time. The electric control unit may perform second pre-crash control as the pre-crash control when the electric control unit determines that the collision probability is high and the time to collision is equal to or smaller than the second threshold execution time, wherein the second pre-crash control is different from the first pre-crash control.

As a result, pre-crash control appropriate for the time to collision can be provided.

In the above configuration, the electric control unit may perform, as the first pre-crash control and the second pre-crash control, control for changing a behavior of the host vehicle in order to avoid collision with the target, and may change the behavior of the host vehicle more greatly in the first pre-crash control than in the second pre-crash control.

As a result, the behavior of the host vehicle for avoiding collision with a target is changed more greatly when the time to collision is small than when the time to collision is large. This makes it possible to increase the probability of avoiding collision with the target.

A second aspect of the present disclosure is a control method of a pre-crash control device. The pre-crash control device includes target information acquisition units and an electric control unit. The control method includes steps of acquiring, by the target information acquisition units, target information that can identify a position of a target with respect to a host vehicle each time a predetermined time elapses; updating, by the electric control unit, a recognized position based on an acquired position each time the target information is newly acquired; estimating, by the electric control unit, a moving direction of the target based on history of the recognized position, and for determining, by the electric control unit, whether a collision probability is high based on the recognized position and the moving direction, the recognized position is a position of the target used for estimating the moving direction of the target, the acquired position is a position of the target identified by the newly acquired target information, and the collision probability is a probability that the target collides with the host vehicle; and performing, by the electric control unit, pre-crash control in order to avoid collision with the target when the electric control unit determines that the collision probability is high and a time to collision becomes equal to or smaller than a threshold execution time, the time to collision is a time for the target to collide with the host vehicle. The step of determining whether the collision probability is high includes estimating a currently predicted position of the target based on the recognized position last updated, updating the recognized position based on the currently predicted position and the acquired position, and updating the recognized position to the acquired position when the time to collision becomes equal to or smaller than a predetermined first threshold switching time.

As a result, the effect similar to that of the first aspect described above can be achieved.

In the above description, the names and/or reference numerals used in the embodiments, which will be described later, are added in brackets to the configuration of the disclosure corresponding to the embodiments in order to facilitate understanding of the disclosure. However, a component of the disclosure is not limited to the embodiment defined by the names and/or the reference numerals. Other objects, other features, and attendant advantages of the present disclosure will be readily understood from the description of the embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
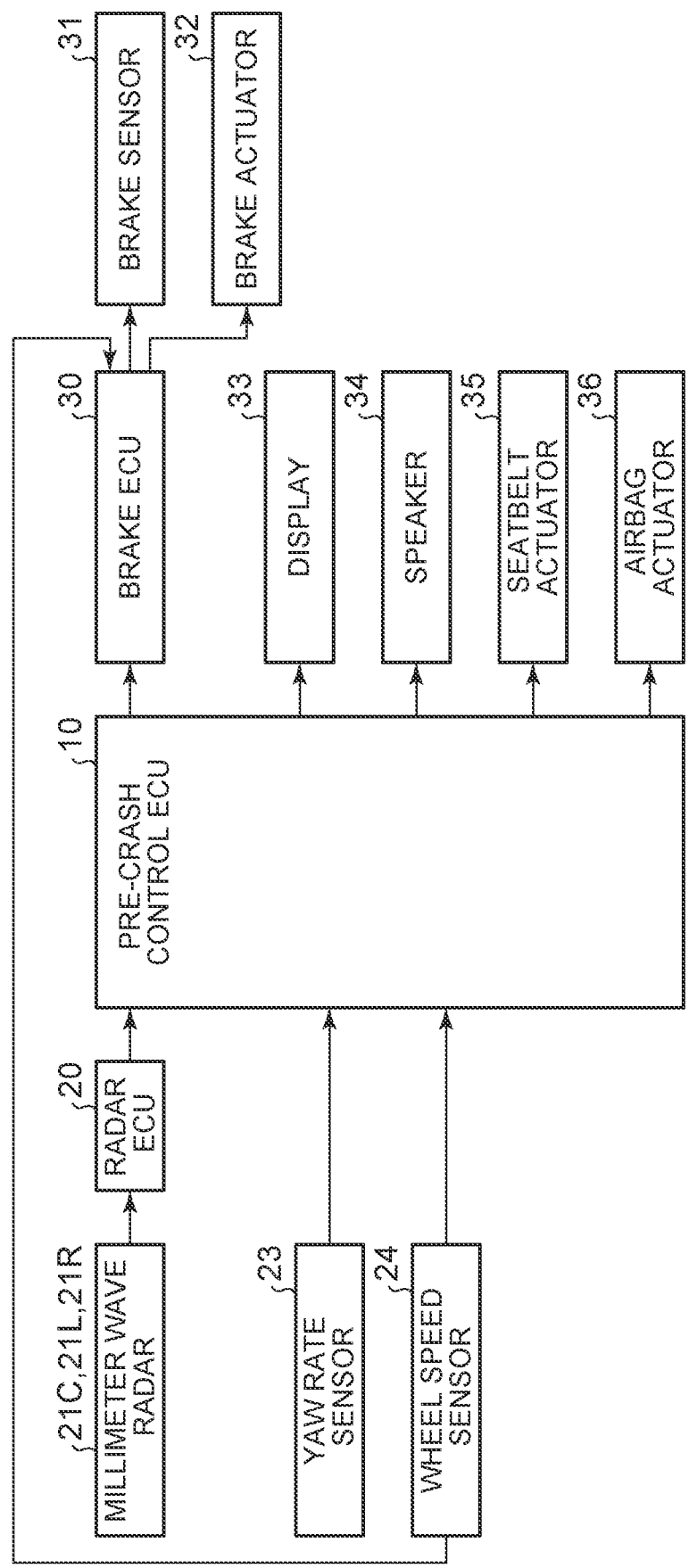
FIG. 1 is a schematic system configuration diagram of a pre-crash control device (present control device) according to an embodiment of the present disclosure.

A pre-crash control device (sometimes referred to as the "present control device" in the description below) according to an embodiment of the present disclosure is applied to a vehicle (sometimes referred to as a "host vehicle SV" in the description below for distinguishing it from other vehicles). As shown in FIG. 1, the present control device includes a pre-crash control ECU 10, a radar ECU 20, and a brake ECU 30.

These ECUs, each of which is an Electric Control Unit (ECU) having a microcomputer as its main component, are connected to each other so that information can be sent and received via a Controller Area Network (CAN) (not shown). In this specification, the microcomputer includes a CPU, a ROM, a RAM, a nonvolatile memory, an interface (I/F). The CPU executes instructions (programs, routines), stored in the ROM, to implement various functions. Some or all of these ECUs may be integrated into one ECU.

Figure 2:
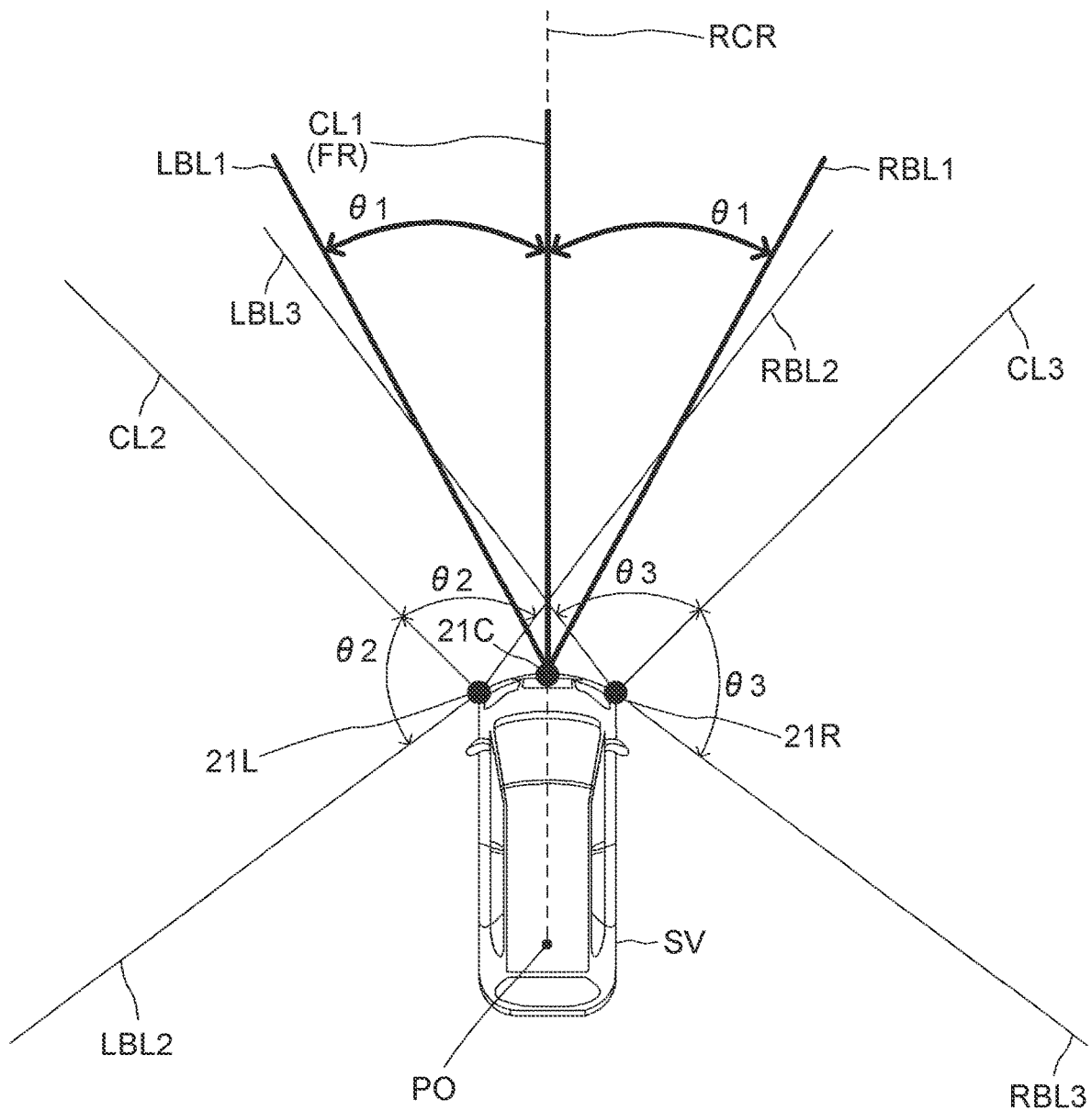
FIG. 2 is a diagram showing the mounting positions and the detectable ranges of millimeter wave radars.

The radar ECU 20 is connected to millimeter wave radars 21C, 21L and 21R. As shown in FIG. 2, the millimeter wave radar 21C is attached to the center in the vehicle width direction of the front end portion of the host vehicle SV, the millimeter wave radar 21L is attached to the left end of the front end portion of the host vehicle SV, and the millimeter wave radar 21R is attached to the right end of the front end of the host vehicle SV. When it is not necessary to distinguish between the millimeter wave radars 21C, 21L and 20R individually, they are called "millimeter wave radar 21".

The millimeter wave radar 21 uses radio waves in the millimeter wave band (hereinafter also referred to as a "millimeter wave") to detect the position of a target and the relative speed of the target relative to the host vehicle SV. More specifically, the millimeter wave radar 21 emits (sends) millimeter waves and receives millimeter waves (reflected waves) reflected by a target which is a 3D object existing within the millimeter wave range. Then, the millimeter wave radar 21 sends the millimeter wave transmission/reception data to the radar ECU 20 as a radar signal.

As shown in FIG. 2, the area (detectable area) in which the millimeter wave radar 21C can detect a target is a sector area that extends in the right direction to the right boundary line RBL1 and in the left direction to the left boundary line LBL1, with its center on the detection axis CL1 extending forward from the vehicle-width-direction center of the front end portion of the host vehicle SV. The detection axis CL1 overlaps with the vehicle front-rear axis FR of the host vehicle SV. The magnitude of the angle formed between the detection axis CL1 and the right boundary line RBL1 and the magnitude of the angle formed between the detection axis CL1 and the left boundary line LBL1 is θ1. Therefore, the central angle of the sector that is the detectable area of the millimeter wave radar 21C is 2θ1.

The millimeter wave radar 21C detects a target on the front side of the host vehicle SV. Similarly, the detectable area of the millimeter wave radar 21L is a sector area that extends in the right direction to the right boundary line RBL2, and in the left direction to the left boundary line LBL2, with its center on the detection axis CL2 extending in the left-forward direction from the left end of the front end portion of the host vehicle SV. The magnitude of the angle formed between the detection axis CL2 and the right boundary line RBL2 and the magnitude of the angle formed between the detection axis CL2 and the left boundary line LBL2 is θ2. Therefore, the central angle of the sector that is the detectable area of the millimeter wave radar 21L is 2θ2. The millimeter wave radar 21L detects a target on the left side of the host vehicle SV.

Similarly, the detectable area of the millimeter wave radar 21R is a sector area that extends in the right direction to the right boundary line RBL3, and in the left direction to the left boundary line LBL3, with its center on the detection axis CL3 extending in the right-forward direction from the right end of the front end portion of the host vehicle SV. The magnitude of the angle formed between the detection axis CL3 and the right boundary line RBL3 and the magnitude of the angle formed between the detection axis CL3 and the left boundary line LBL3 is θ3. Therefore, the central angle of the sector that is the detectable area of the millimeter wave radar 21R is 2θ3. The millimeter wave radar 21R detects a target on the right side of the host vehicle SV.

The distance (detectable distance) at which the millimeter wave radar 21 can detect a target is 80 m. Therefore, the lengths of the detection axes CL1 to CL3, the right boundary lines RBL1 to RBL3, and the left boundary lines LBL1 to LBL3 from the millimeter wave radar 21 are 80 m. In FIG. 2, the illustration of the total length of these lines is omitted for convenience of description.

Returning to FIG. 1, the radar ECU 20 detects a "target point that is a point reflecting millimeter waves at the target", based on the radar signal sent from the millimeter wave radar 21. The radar ECU 20 acquires the radar signal from the millimeter wave radar 21 at predetermined time intervals and, based on the acquired radar signal, determines whether there is a target point. When there is a target point, the radar ECU 20 calculates the distance from the host vehicle SV to the target point, based on the time from the transmission to the reception of the millimeter wave. At the same time, the radar ECU 20 calculates the direction of the target point with respect to the host vehicle SV, based on the direction of the reflected millimeter wave. The position of a target point relative to the host vehicle SV is identified using the distance from the host vehicle SV to the target point and the direction of the target with respect to the host vehicle SV.

Furthermore, the radar ECU 20 calculates the speed of a target point. More specifically, the radar ECU 20 calculates the relative speed of a target point with respect to the host vehicle SV, based on the frequency change (Doppler effect) of the reflected wave of the millimeter wave.

The radar ECU 20 sends the target point signal to the pre-crash control ECU 10. The target point signal includes presence/absence information indicating whether there is a target point. Furthermore, the target point signal includes the information that identifies the position of a target point (the distance from the host vehicle SV to the target point and the direction of the target point with respect to the host vehicle SV) and the information that indicates the relative speed of the target point.

The pre-crash control ECU 10, connected to the sensors given below, receives the detection signals of these sensors. Each sensor may be connected to an ECU other than the pre-crash control ECU 10. In that case, the pre-crash control ECU 10 receives, via the CAN, the detection signal of a sensor from the ECU to which the sensor is connected.

A yaw rate sensor 23 detects the yaw rate acting on the host vehicle SV and outputs the signal representing the detected yaw rate.

A wheel speed sensor 24, provided for each wheel of the host vehicle SV, generates one pulse signal (wheel pulse signal) each time the wheels rotate by a predetermined angle. The pre-crash control ECU 10 measures the number of pulses of the wheel pulse signal sent from each wheel speed sensor 24 per unit time and calculates the rotational speed (wheel speed) of each wheel based on the measured number of pulses. The pre-crash control ECU 10 calculates the vehicle speed Vs indicating the speed of the host vehicle SV, based on the wheel speed of each wheel. The vehicle speed Vs is, for example, the average value of the wheel speeds of the four wheels.

The brake ECU 30, connected to the wheel speed sensor 24 and a brake sensor 31, receives detection signals from these sensors. The brake sensor 31, a sensor for detecting a parameter used for controlling a braking device (not shown) mounted on the host vehicle SV, includes a sensor for detecting the operation amount (depression amount) of the brake pedal.

Furthermore, the brake ECU 30 is connected to a brake actuator 32. The brake actuator 32 is a hydraulically controlled actuator. The brake actuator 32 is provided in a hydraulic circuit (none of which is shown) between the mass cylinder for pressurizing the hydraulic fluid in accordance with the depressing force of the brake pedal and a friction brake device including a known wheel cylinder provided for each wheel. The brake actuator 32 adjusts the oil pressure supplied to the wheel cylinders. The brake ECU 30 adjusts the braking force (the acceleration (the negative acceleration, that is, the deceleration) of the host vehicle SV) to each wheel by driving the brake actuator 32.

When the brake assist signal is received from the pre-crash control ECU 10, the brake ECU 30 drives the brake actuator 32 so that, when the driver applies a brake pedal pressure, a predetermined braking force larger than the braking force corresponding to the pedal pressure is applied irrespective of the magnitude of the applied pedal pressure.

Furthermore, when the brake instruction signal is received from the pre-crash control ECU 10, the brake ECU 30 controls the brake actuator 32 and, thereby, reduces the vehicle speed Vs through braking so that the actual acceleration of the host vehicle SV becomes equal to the target deceleration TG included in the braking instruction signal. The pre-crash control ECU 10 acquires the actual acceleration of the host vehicle SV based on the amount of change in the vehicle speed Vs per unit time.

A display 33 is a head-up display (referred to as "HUD" in the description below) that receives the display information from various ECUs in the host vehicle SV and displays the received display information on a part of the windshield of the host vehicle SV (display area). On the display 33, an alert screen for alerting the driver to a "target that is detected by the millimeter wave radar 21 and is highly likely to collide with the host vehicle SV" is displayed. When the display signal, which is an instruction to display the alert screen, is received from the pre-crash control ECU 10, the display 33 displays the alert screen. The display 33 may be a liquid crystal display.

When the output signal, which is an instruction to output the warning sound, is received from the pre-crash control ECU 10, a speaker 34 outputs the "warning sound that alerts the driver to a target highly likely to collide with the host vehicle SV" in response to the received output signal.

A seatbelt actuator 35 is an actuator for reducing a slack in the seatbelt by winding up the seatbelt. When the wind-up signal is received from the pre-crash control ECU 10, the seatbelt actuator 35 reduces a slack in the seat belt by winding up the seat belt to prepare for collision with a target highly likely to collide with the host vehicle SV.

An airbag actuator 36 is an actuator for operating the inflator for deploying the airbag. The airbag is provided at six positions in this example: front of the driver's seat, right side of the driver's seat, front of the passenger seat, left side of the passenger seat, left side of the rear seat, and right side of the rear seat. Therefore, the airbag actuator 36 is provided corresponding to each of the six airbags. When the preparation signal is received from the pre-crash control ECU 10, the airbag actuator 36 prepares the inflator for deploying the airbag.

Outline of Operation

Next, the outline of the operation of the present control device will be described. The present control device acquires the target point signal from the millimeter wave radar 21 each time a predetermined time (sampling interval) elapses. Based on the acquired target point signal, the present control device recognizes the "position of a target point and the speed of the target point" and, based on the history of the recognized target point position (hereinafter referred to as a "recognized position"), calculates (estimates) the moving direction of the target point. The present control device recognizes the position of a target point and the speed of the target point each time a predetermined time (sampling interval) elapses, using one of the two methods: the $\alpha\beta$ filter method (hereinafter sometimes referred to as a "first method") and the position differentiation method (hereinafter sometimes referred to as a "second method"). The present control device plots the recognized positions in the coordinate system at the present time (hereinafter referred to as the "current coordinate system"). The current coordinate system is a coordinate system in which the origin is the vehicle-width-direction center of the left-to-right rear wheel axle of the host vehicle SV (the point PO shown in FIG. 2, hereinafter referred to as the "host vehicle point") and in which X-axis is set in the vehicle width direction and the Y axis is set in the vehicle front-to-rear axis FR direction. When the target point signal is acquired from the millimeter wave radar 21, the present control device converts the coordinates of all the target points recognized in the past to the coordinates in the current coordinate system. This coordinate conversion is performed based on the route along which the host vehicle SV has traveled from the time when the target point signal was acquired last from the millimeter wave radar 21 (hereinafter referred to as the "last-acquired time point") to the current time point and on the distance over which the host vehicle has traveled along the route. The detail will be described later.

The $\alpha\beta$ filter method described above will be briefly described below. In the description below, the coordinate-converted position of the position of a target identified by the present control device based on the target point signal is referred to as an "acquired position" (which is a position of the target identified by the target information that is newly acquired, when the time to collision is greater than a predetermined first threshold switching time). The coordinate-converted position of the position of a target newly recognized by the present control device is referred to as a "currently recognized position" (which is a position of the target identified by the target information that is newly recognized, when the time to collision is equal to or smaller than a predetermined first threshold switching time). The coordinate-converted position of the position of a target recognized by the present control device a predetermined time ago (more specifically, in the immediately preceding interval) is referred to as a "last recognized position". In addition, the coordinate-converted speed of the speed of a target recognized by the present control device a predetermined time ago is referred to as a "last recognized speed".

According to the $\alpha\beta$ filter method, the present control device estimates the position of a target point at the current time point (hereinafter referred to as a "predicted position") based on the last recognized position and the last recognized speed of the certain target point. Next, the present control device recognizes, as the position of the target point, the position calculated by weighted averaging the acquired position and the predicted position using a predetermined weighting coefficient $\alpha$ (the position calculated in this way is referred to as the "smoothed position" in the description below) and then plots the recognized position in the current coordinate system. In addition, the present control device calculates the speed of the target point using the weighting coefficient $\beta$, based on the last recognized speed and the speed calculated based on the difference (residual) between the acquired position and the predicted position (hereinafter referred to as a "residual speed") and, then, recognizes the calculated speed as the speed of the target point. This speed of the target point is the ground speed relative to the ground of the target point (i.e., absolute speed).

Next, the position differentiation method will be briefly described. According to the position differentiation method, the present control device recognizes the acquired position directly as the position of a target point. In addition, the present control device calculates the speed of the target point (ground speed) by dividing the distance between the last recognized position and the acquired position by the time from the last-acquired time point to the current time point (that is, the sampling interval, predetermined time) and, then, recognizes the calculated speed as the speed of the target point. Since the sampling interval is sufficiently short, the calculated speed of the target point can be considered as the time differentiated value of the acquired position.

Next, the present control device estimates the future moving direction of the target point based on the history of the recognized position of the target point. Furthermore, the present control device determines whether the target point is likely to collide with the host vehicle SV, based on the vehicle speed Vs of the host vehicle SV at the current time point, the travel predicted course RCR (see FIG. 2) of the host vehicle SV that will be described later, and the estimated moving direction of the target point and the recognized speed of the target point.

More specifically, the present control device calculates the intersection point between the "travel predicted course RCR of the host vehicle SV" and the "straight line extending in the moving direction estimated from the position of the recognized position of the target point" (hereinafter, this intersection point is sometimes referred to as a "collision predicted intersection point"). The present control device calculates the time required for the host vehicle point to arrive at the intersection point along the travel predicted course RCR (hereinafter sometimes referred to as the "host vehicle arrival time" or the "first time") and the time required for the target point to arrive at the intersection point (hereinafter sometimes referred to as the "target point arrival time" or "second time"). After that, the present control device determines whether the difference between the host vehicle arrival time and the target point arrival time is within a "predetermined range including 0". The series of processing described above is also called the "collision determination processing". If the difference between the host vehicle arrival time and the target point arrival time is within the predetermined range, it is determined that the target point may collide with the host vehicle SV. This predetermined range is set to a time range in which the target point and the "predetermined collision determination area including the host vehicle SV" intersect. This collision determination area is set in such a way that the front area ahead of the front end of the host vehicle SV by a predetermined distance, the left side area to the left of the host vehicle SV by a predetermined distance, a right side area to the right of the host vehicle SV by a predetermined distance, and the rear area behind the rear end of the host vehicle SV by a predetermined distance. Therefore, it is determined that not only a target point that is predicted to collide with the host vehicle SV but also a target point that will pass through one of the front area, the left side area, the right side area, and the rear area of the host vehicle SV (in other words, a target point which will be very close to the host vehicle SV) will have the probability of collision with the host vehicle SV.

If there is a probability that a target point will collide with the host vehicle SV, the present control device adds 1 to the collision determination count N of the target point. If the collision determination count N is equal to or larger than the threshold count Nth, the present control device determines that the target point is an obstacle point. The collision determination count N is set to 0 if it is determined that there is no probability that a target point will collide with the host vehicle SV. Therefore, if the number of times that a target point is consecutively determined to collide with the host vehicle SV becomes equal to or larger than the threshold count Nth, the target point is determined to be an obstacle point.

When the time to collision TTC required for an obstacle point to collide with the host vehicle SV is equal to or smaller than the first threshold time T1th, the present control device performs pre-crash control for avoiding collision with a target (obstacle) including the obstacle point or for reducing impact in the collision. This time to collision TTC is calculated by dividing the "distance to the obstacle point included in the target point signal" by the "relative speed of the obstacle point included in the target point signal". Therefore, the time to collision TTC is calculated based only on the target point signal.

The features of the $\alpha\beta$ filter method and the position differentiation method will be described below. If the distance of a target point from the millimeter wave radar 21 is far, the detection error of the millimeter wave radar 21 becomes large. Therefore, even if the target point moves in uniform linear motion, the acquired position varies with respect to a certain straight line. That is, there is a variation in the history of the acquired position. This means that, when the moving direction of the target point is estimated based on the history of the recognized position recognized using the position differentiation method, the moving direction of the target point estimated at each of the time points is more likely to change greatly (the moving direction becomes unstable chronologically). On the other hand, in the $\alpha\beta$ filter method, the position obtained by weighted averaging the predicted position and the acquired position is recognized as the position of a target point. This means that, even if the acquired position varies due to the detection error of the millimeter wave radar 21, the variation in the position of the recognized target point becomes small. As a result, the position of a target point recognized using the $\alpha\beta$ filter method is highly likely to have a small deviation from a straight line. Therefore, when the moving direction of a target point is estimated based on the history of the recognized position using the $\alpha\beta$ filter method, the probability that the moving direction of a target point is greatly changed is low with the result that the moving direction is stabilized chronologically.

If the moving direction of a target point changes at each of the time points, the collision determination result of the target point also becomes unstable chronologically. That is, a target point determined likely to collide with the host vehicle SV at a certain point in time is determined not likely to collide with the host vehicle SV at the next point in time. Therefore, it is desirable that the position of a target point be recognized using the $\alpha\beta$ filter method as much as possible.

However, there is a probability that the recognized position (smoothed position) calculated using the $\alpha\beta$ filter method results in an increase in the deviation from the acquired position as the number of recognitions (the number of times the smoothing operations is performed, the number of times the estimation is made) increases. For example, if the acquired position is continuously detected in one of the left direction and the right direction of the predicted position and if the X component (component in the vehicle width direction) of the last calculated smoothed speed indicates that the currently predicted position is further moved away from the currently acquired position, the deviation of the recognized position from the acquired position increases proportionally to an increase in the number of recognitions until the X component of the last calculated smoothed speed indicates that the currently predicted position becomes closer to the currently acquired position.

Such a deviation is likely to be larger than the detection error of the millimeter wave radar 21. That is, the acquired position is more likely to be closer to the actual position of the target point (the actual position) than the recognized position where the deviation has occurred. In particular, when the number of recognitions increases, the error of the recognized position with respect to the actual position increases. On the other hand, when the number of recognitions increases, the error of the acquired position with respect to the actual position becomes small since the distance between the target point and the millimeter wave radar 21 becomes short. Nevertheless, the collision determination, if made based on the recognized position that may possibly have an error from the actual position, may deteriorate the determination accuracy.

Based on the above viewpoint, while the time to collision TTC of a target point is larger than the "first threshold switching time ST1th that is set within a predetermined time range from the first threshold time T1th", the present control device uses the αβ filter method to recognize the position of the target point (that is, calculates the smoothed position as the recognized position) and, based on the history of the recognized position, approximates the moving direction of the target point by a straight line. Then, based on the result, the present control device calculates the collision predicted intersection point described above and, in addition, calculates the target point arrival time described above.

Furthermore, when the time to collision TTC of the target point becomes equal to or smaller than the first threshold switching time ST1th, the present control device uses the position differentiation method to recognize the acquired position directly as the position of the target point and, after that, resumes the recognition of the position of the target point using the αβ filter method.

Since the position of the target point is once recognized using the position differentiation method, the deviation of the recognized position from the acquired position, generated due to an increase in the number of recognitions using the αβ filter method, can be set to 0 (can be reset). In addition, when the time to collision TTC of the target point becomes equal to or smaller than the first threshold switching time ST1th, the distance from the target point to the millimeter wave radar 21 is relatively small, meaning that the error of the acquired position with respect to the actual position is small. Thus, the recognized position is corrected to the actual position of the target point. Therefore, the present control device can prevent a degradation in the accuracy of collision determination that may be caused by a deviation of the recognized position from the acquired position that has been accumulated due to the use of the αβ filter method, thus reducing the probability that unnecessary pre-crash control is performed and the probability that necessary pre-crash control is not performed.

Figure 3:
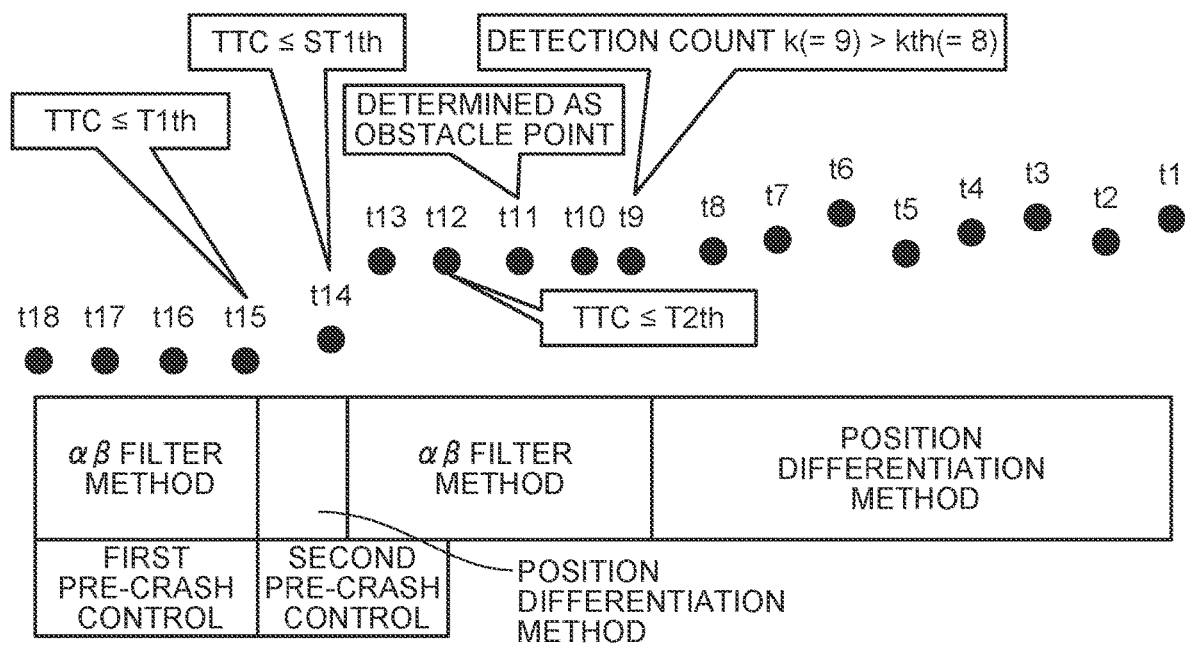
FIG. 3 is a diagram showing the outline of the operation of the present control device.

The above-described operation of the present control device will be described in detail with reference to FIG. 3. In the example shown in FIG. 3, the following assumptions hold. The pre-crash control processing for implementing pre-crash control is performed each time a predetermined time (predetermined sampling interval) elapses. At time point t1 to time point t18 shown in FIG. 3, the pre-crash control processing is performed to recognize the position of a target point identified as being the same target point. Note that time point t1 is the least recent time and time point t18 is the most recent time. At time point t9, the detection count k of the target point becomes larger than the threshold count kth. At time point t11, the collision determination count N of the target point becomes equal to or larger than threshold count Nth, and the target point is determined as an obstacle point. At time point t12, the time to collision TTC of the target point becomes equal to or smaller than the second threshold time T2th. The second threshold time T2th is set to a value larger than both the first threshold time T1th and the first threshold switching time ST1th. At time point t14, the time to collision TTC of the target point becomes equal to or smaller than the first threshold switching time ST1th. At time point t15, the time to collision TTC of the target point becomes equal to or smaller than the first threshold time T1th.

When a target point is newly detected (time point t1), the present control device uses the position differentiation method to recognize the position and the speed of the target point while the detection count k of the target point is equal to or smaller than the threshold count kth (from time point t1 to time point t8). The present control device performs the above-described collision determination processing using the position and the speed.

The detection count k of the target point becomes larger than the threshold count kth at time point t9 according to the assumption described above. Therefore, from time point t9 to "time point t14 at which the time to collision TTC of the target point becomes equal to or smaller than the first threshold switching time ST1th", the present control device uses the αβ filter method to recognize the position and speed of the target point. The present control device performs the collision determination processing described above using the recognized position and speed.

According to the assumption described above, the collision determination count N, which indicates the number of times the probability that the target point will collide with the host vehicle SV is determined, becomes equal to or larger than the threshold count N1th at time point t11. Therefore, the target point is determined as an obstacle point.

According to the assumption described above, since the time to collision TTC of the target point, which was determined to be an obstacle point, becomes equal to or smaller than the second threshold time T2th at time point t12, the present control device starts the second pre-crash control. The second pre-crash control includes alarm control and braking control. The alarm control is an operation to output an alarm to alert the driver to the targets including the target point. The braking control is a control operation to reduce the vehicle speed Vs by braking so that, even if the driver does not give pedal pressure to the brake pedal, the actual acceleration of the host vehicle SV matches the target deceleration TG.

According to the assumption described above, the time to collision TTC of the target point becomes equal to or smaller than the first threshold switching time ST1th at time point t14. Therefore, at time point t14, the present control device uses the position differentiation method to once recognize the position and speed of the target point. The present control device performs the collision determination processing described above using the recognized position and speed. Note that, in this case, the present control device approximates the moving direction of the target point by a straight line using the position recognized at time point t14 and the positions recognized at the time points before time point t14, and estimates the approximated straight line as the moving direction of the target point. The detail of the estimation of the moving direction will be described later. Then, the present control device calculates the collision predicted intersection point described above using the estimated moving direction and the position and the speed recognized at time point t14 and, in addition, calculates the target point arrival time described above. After that, at time point t15, the present control device resumes recognizing the position and speed of the target point again using the αβ filtering method and performs the collision determination processing described above using the recognized position and speed.

According to the assumption described above, the time to collision TTC of the target point becomes equal to or smaller than the first threshold time T1th at time point t15 and, therefore, the present control device starts the first pre-crash control. The first pre-crash control is a control operation that is performed when the probability of collision is higher than that of the second pre-crash control. For example, the first pre-crash control includes the alarm control, braking support control, braking control, and air bag preparation control. The detail of the first pre-crash control will be described later. The target deceleration TG of the braking control of the first pre-crash control is set to a value larger than the target deceleration TG of the brake control of the second pre-crash control. That is, the braking control of the first pre-crash control can greatly change the behavior of the host vehicle SV than the braking control of the second pre-crash control, thus increasing the probability of avoidance of collision between the host vehicle SV and the targets including the target point.

Since the position of a target point is recognized using the αβ filter method from time point t9 to time point t13, there is a probability that the recognized position of the target point at time point t13 is largely deviated from the actual position. However, the acquired position, where the error of the target point from the actual position is small, is recognized as the position of the target point at time point t14 and, from time point t15, the position of the target point is recognized using the αβ filtering method. Using the position differentiation method in this way allows the above-described deviation of the recognized position to be reset, increasing the accuracy of collision determination.

Actual Operation

Figure 4:
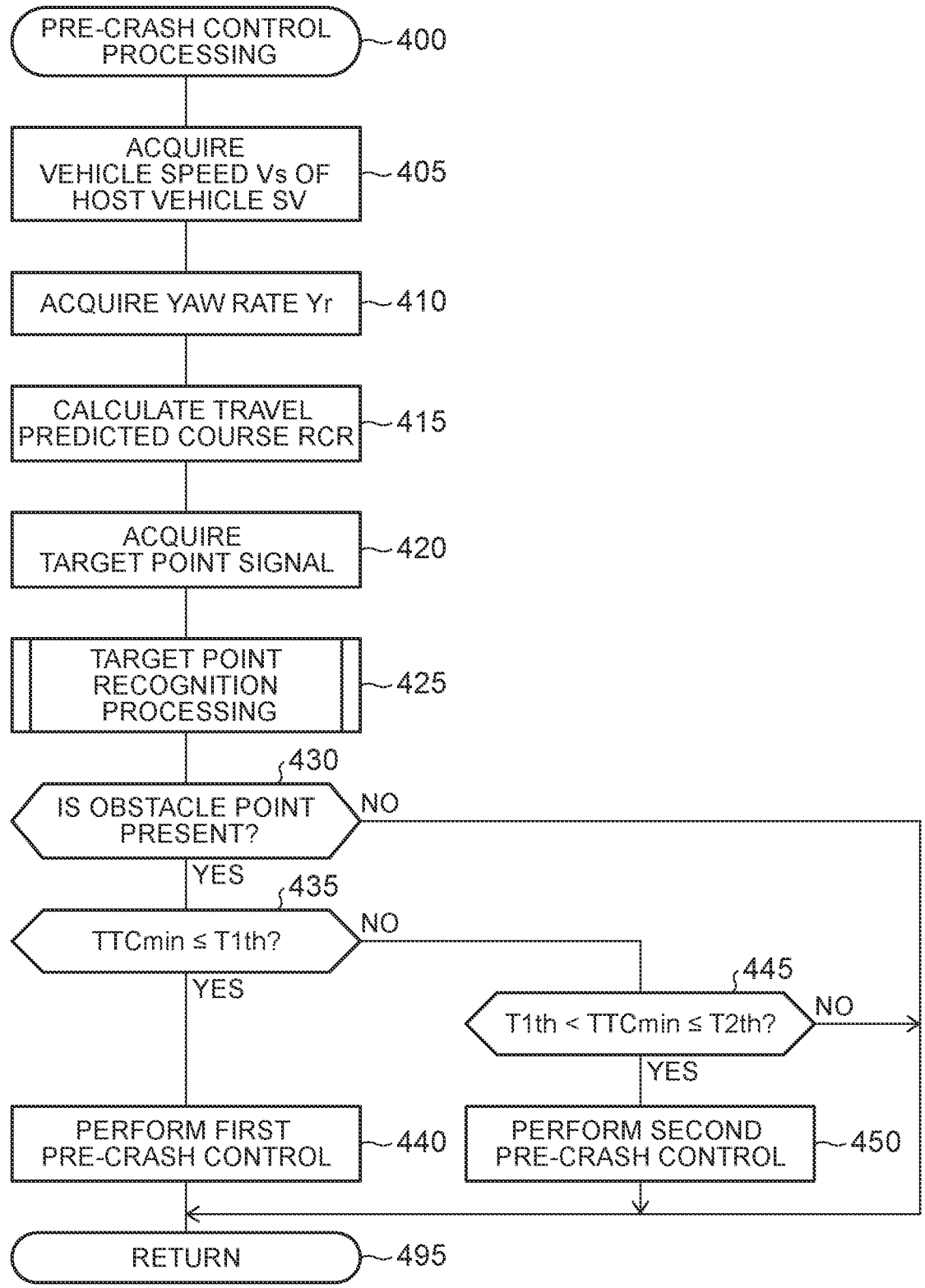
FIG. 4 is a flowchart showing a routine performed for the first time by the CPU of a pre-crash control ECU shown in FIG. 1.

The CPU of the pre-crash control ECU 10 performs the pre-crash control processing in the following way. That is, if the time to collision TTC is equal to or smaller than the first threshold time T1th, the CPU of the pre-crash control ECU 10 performs the first pre-crash control. If the time to collision TTC is larger than the first threshold time T1th and is equal to or smaller than the "second threshold time T2th that is larger than the first threshold time T1th", the CPU of the pre-crash control ECU 10 performs the second pre-crash control. The routine that is performed when the pre-crash control processing is performed for the first time is shown in FIG. 4.

Therefore, when the pre-crash control processing is performed for the first time, the CPU starts the processing in step 400 in FIG. 4, sequentially performs the processing in steps 405 to 425 described below and, after that, the processing proceeds to step 430.

Step 405: The CPU acquires the vehicle speed Vs of the host vehicle SV based on the wheel pulse signal received from the wheel speed sensor 24. Step 410: The CPU acquires the yaw rate Yr, which acts on the host vehicle SV, from the yaw rate sensor 23.

Step 415: The CPU calculates the travel predicted course RCR (see FIG. 2) of the host vehicle SV. The processing in step 415 will be described in detail. The CPU calculates the turning radius of the host vehicle SV based on the vehicle speed Vs of the host vehicle SV, acquired in step 405, and the yaw rate Yr acquired in step 410. Then, based on the calculated turning radius, the CPU estimates, as the travel predicted course RCR, a traveling course along which the vehicle-width-direction center point of the host vehicle SV (the actual center point is the center point PO on the left-to-right rear wheel axle of the host vehicle SV (see FIG. 2)) is moving. In this case, when the yaw rate Yr is generated, the CPU estimates a circular arc course as the travel predicted course RCR; on the other hand, when the yaw rate Yr is 0, the CPU estimates a straight course along the direction of acceleration, which acts on the host vehicle SV, as the travel predicted course RCR. The CPU acquires the actual acceleration of the host vehicle SV based on the change amount per unit time of the vehicle speed Vs. Step 420: The CPU acquires the target point signal from the radar ECU 20.

Step 425: Based on the position of the target point represented by the target point signal acquired in step 420, the CPU performs the target point recognition processing for recognizing the position and speed of the target point. In the actual processing, when the processing proceeds to step 425, the CPU performs the subroutine shown in the flowchart in FIG. 5.

That is, when the processing proceeds to step 425, the CPU sequentially performs the processing in step 505 to step 530 shown in FIG. 5 described below, and then the processing proceeds to step 535.

Step 505: The CPU selects an arbitrary target point as the processing target from the target points identified by the target point signal. In the description below, the selected target point is referred to as an "object point". Step 510: The CPU sets the detection count k of the object point to 1. In step 510, the CPU assigns a unique identifier to the object point.

Step 515: The CPU recognizes the acquired position as the position of the object point. Step 520: The CPU calculates the ground speed of the object point based on the "relative speed of the object point included in the target point signal with respect to the host vehicle SV" and the "vehicle speed Vs of the host vehicle SV acquired in step 405". Then, the CPU recognizes this ground speed as the speed of the object point.

Step 530: The CPU estimates the direction of the ground speed of the object point, acquired in step 520, as the future moving direction of the object point, and the processing proceeds to step 535.

In step 535, the CPU performs the collision determination processing for determining whether there is a probability that the object point will collide with the host vehicle SV, and the processing proceeds to step 540. In the actual processing, when the processing proceeds to step 535, the CPU performs the subroutine shown in the flowchart in FIG. 6.

That is, when the processing proceeds to step 535, the CPU sequentially performs the processing in steps 605 to 620 shown in FIG. 6 described below, and then the processing proceeds to step 625.

Step 605: The CPU calculates the intersection point (i.e., the collision predicted intersection point) between the travel predicted course RCR of the host vehicle SV, calculated in step 415 shown in FIG. 4, and the straight line extending from the currently recognized position of the object point into the moving direction of the object point (that is, the estimated course of the object point). Step 610: The CPU calculates the host vehicle arrival time AT1 that indicates the time until the host vehicle point arrives at the collision predicted intersection point when the host vehicle point travels along the "travel predicted course RCR" while maintaining the current vehicle speed Vs. Step 615: The CPU calculates the object point arrival time AT2 that indicates the time until the object point arrives at the collision predicted intersection point when the object point moves along the "moving direction of the object point" while maintaining the "recognized speed".

Step 620: The CPU calculates the time difference ΔAT by subtracting the object point arrival time AT2 from the host vehicle arrival time AT1. Step 625: The CPU determines whether the time difference ΔAT, calculated in step 620, is equal to or larger than the "first threshold difference ΔT1th that is a negative value" and is equal to or smaller than the "second threshold difference AT2th that is a positive value". When the time difference ΔAT is a negative value, the host vehicle arrival time AT1 is smaller than the object point arrival time AT2. In other words, when the time difference ΔAT is a negative value, the host vehicle SV arrives at the collision predicted intersection point before the object point. On the other hand, when the time difference ΔAT is a positive value, the host vehicle arrival time AT1 is larger than the object point arrival time AT2. In other words, when the time difference ΔAT is a positive value, the host vehicle SV arrives at the collision predicted intersection point after the object point. Therefore, the first threshold difference AT1th is set to a negative value, and the second threshold difference AT2th is set to a positive value. Note that the absolute value of the first threshold difference AT1th and the absolute value of the second threshold difference AT2th may be the same value or different values.

If the time difference ΔAT is equal to or larger than the first threshold difference AT1th and is equal to or smaller than the second threshold difference AT2th, it can be determined that there is a high probability that the object point will collide with the host vehicle SV. Therefore, in this case, the CPU determines that the result of step S625 is "Yes" and the processing proceeds to step 630 to add 1 to the collision determination count N of the object point and, then, the processing proceeds to step 635.

In step 635, the CPU determines whether the collision determination count N of the object point is equal to or larger than the threshold count N1th. If the collision determination count N of the object point is equal to or larger than the threshold count N1th, the CPU determines that the result of step 635 is "Yes" and the processing proceeds to step 640. In step 640, the CPU determines (recognizes) the object point as an obstacle point, and the processing proceeds to step 695 to once terminate this routine. Then, the processing proceeds to step 540 shown in FIG. 5. On the other hand, if the collision determination count N of the object point is smaller than the threshold count N1th, the CPU determines that the result of step 635 is "No" and the processing proceeds to step 695 to once terminate this routine. Then, the processing proceeds to step 540 shown in FIG. 5. As a result, if the collision determination count N of the object point is smaller than threshold count N1th, the object point is not recognized as an obstacle point.

On the other hand, if the time difference ΔAT is smaller than the first threshold difference AT1th or larger than the second threshold difference AT2th when the CPU performs the processing in step 625, it can be determined that there is no probability that the object point will collide with the host vehicle SV. In this case, the CPU determines that the result of step 625 is "No", and the processing proceeds to step 645 to set the collision determination count N of the object point to 0. Then, the processing proceeds to the processing in step 635 and subsequent steps. That is, if it is determined in step 625 that "there is no probability that the object point will collide with the host vehicle SV" before the collision determination count N becomes equal to or larger than the threshold count N1th, the collision determination count is set to 0. Therefore, if the determination that "there is a probability that the object point will collide with the host vehicle SV (the determination in step 625 is "Yes")" is not consecutively made the number of times equal to or larger than the threshold count N1th, the object point is not determined as an obstacle point. Therefore, when the "moving direction of the target point indicated by the recognized position of the target point" varies chronologically with respect to the correct moving direction of the position of the target point (that is, when the estimated moving direction of the target point becomes unstable chronologically), the probability that the the object point that is actually an obstacle point is not determined as an obstacle point becomes high. In other words, the accuracy in determining whether the object point is an obstacle point is decreased.

Figure 5:
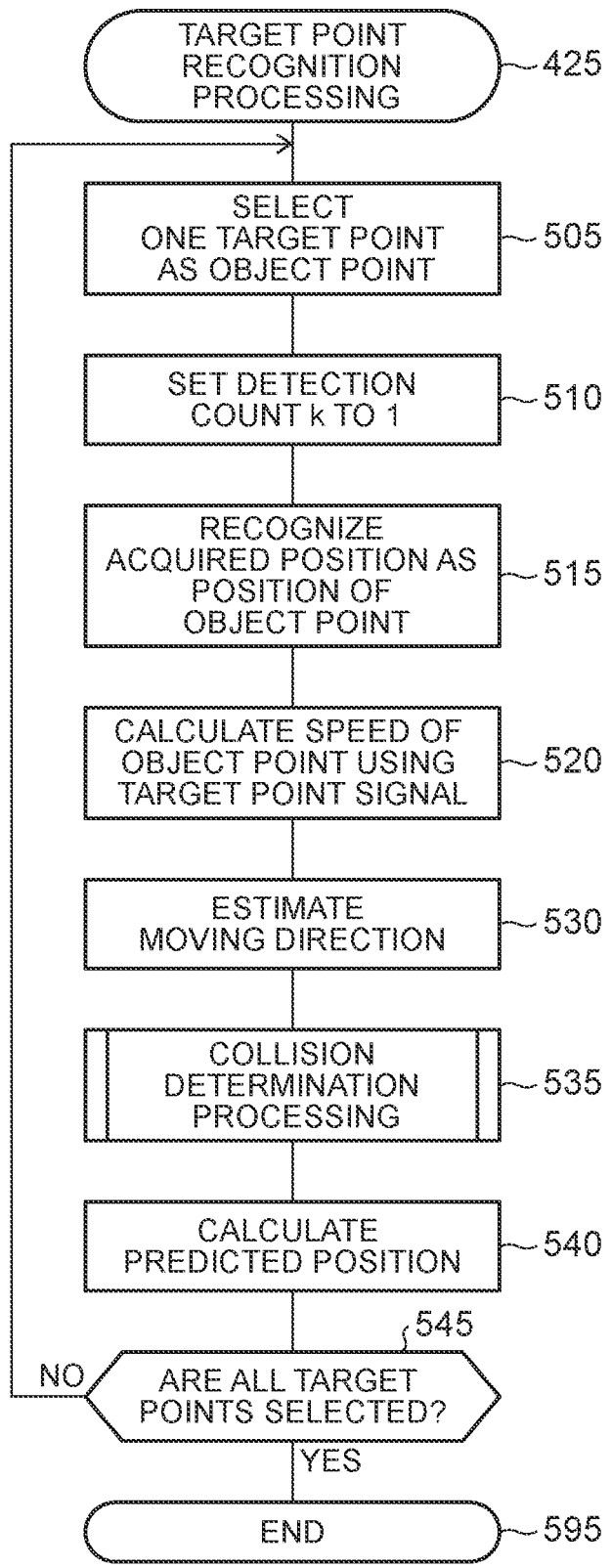
FIG. 5 is a flowchart showing a routine performed by the CPU of the pre-crash control ECU in the collision determination processing performed by the routine shown in FIG. 4.
Figure 6:
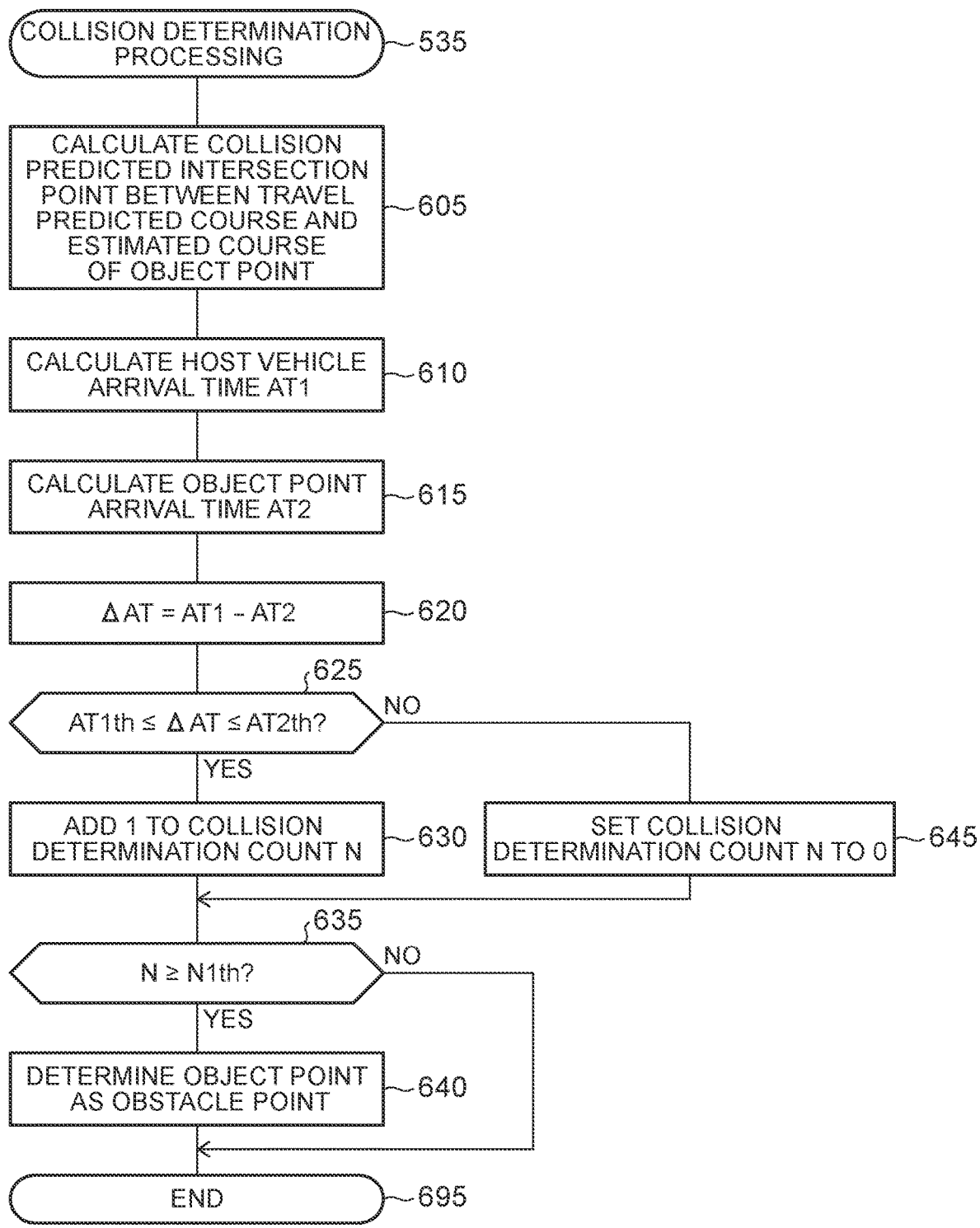
FIG. 6 is a flowchart showing a routine performed by the CPU of the pre-crash control ECU in the collision determination processing performed by the routine shown in FIG. 5.

When the processing proceeds from step 695 in FIG. 6 to step 540 in FIG. 5, the CPU calculates the predicted position. The predicted position is a position at which the object point is predicted to be located the next time the pre-crash control processing is performed. The CPU stores the calculated predicted position, as well as the identifier of the object point, in the RAM. At this time, as the predicted position, the CPU calculates the position that advances from the position of the object point, recognized in step 515, along the moving direction, estimated in step 530, by the distance corresponding to the "value calculated by multiplying the speed, calculated in step 520, by the time from the current time point to the time when the next pre-crash control processing is performed (that is, the time corresponding to the sampling interval described above, hereinafter referred to as "execution time T").

In step 545, the CPU determines whether all target points identified by the target point signal are selected as an object point. If all the target points are not yet selected as an object point, the CPU determines that the result of step 545 is "No" and the processing returns to step 505. Then, the CPU selects a target point, not yet selected as an object point, as an object point and the processing proceeds to step 510 and subsequent steps. On the other hand, if all the target points are selected as an object point, the CPU determines that the result of step 545 is "Yes" and the processing proceeds to step 595 to once terminate this routine. Then, the processing proceeds to step 430 shown in FIG. 4.

In step 430, the CPU determines whether there is a target point that was determined as an obstacle point in step 640 shown in FIG. 6. If there is no such obstacle point, the CPU determines that the result of step 430 is "No", and the processing proceeds to step 495 to once terminate this routine. As a result, no pre-crash control is performed.

On the other hand, if there is an obstacle point, the CPU determines that the result of step 430 "Yes" and the processing proceeds to step 435. In step 435, the CPU determines whether the minimum time to collision TTC (hereinafter referred to as "time to collision TTCmin") of the obstacle points is equal to or smaller than the first threshold time T1th. As described above, the time to collision TTC of an obstacle point is calculated based on the relative speed of the target point, included in the target point signal, with respect to the host vehicle SV and the distance from the millimeter wave radar 21 to the target point.

If the time to collision TTCmin is equal to or smaller than the first threshold time T1th, the CPU determines that the result of step 435 is "Yes" and the processing proceeds to step 440. In step 440, the CPU performs the first pre-crash control, and the processing proceeds to step 495 to once terminate this routine. The first pre-crash control is performed when the probability of collision is higher than that of the second pre-crash control that will be described later. More specifically, the first pre-crash control includes the alarm control, braking assist control, braking control, and air bag preparation control. The first pre-crash control is sometimes referred to as "Pre-Crash Safety system (PCS) control".

The alarm control is a control operation for outputting an alarm for alerting the driver to an obstacle that is a target including an obstacle point. When the alarm control is performed, the display 33 displays the "alert screen indicating a high probability of collision" and the speaker 34 outputs a warning sound. The braking assist control is a control operation that is performed when the driver gives a pedal pressure to the brake pedal and that decelerates the host vehicle SV with a predetermined braking force larger than the driver's pedal pressure irrespective of the magnitude of the pedal pressure. This control is sometimes referred to as the "brake assist control". The braking control is, as described above, a control operation for reducing the vehicle speed Vs by braking so that, even if the driver does not give a pedal pressure to the brake pedal, the actual acceleration of the host vehicle SV matches the target deceleration TG. The airbag preparation control is a control operation for enabling the airbag to be deployed immediately.

More specifically, the CPU sends the display signal to the display 33. When the display signal is received, the display 33 displays the alert screen. In addition, the CPU sends the output signal to the speaker 34. When the output signal is received, the speaker 34 outputs the warning sound in response to the received output signal. Furthermore, the CPU sends the braking assist signal to the brake ECU 30. When the braking assist signal is received, the brake ECU 30 changes the state to the state in which the braking assist control can be performed. In addition, the CPU sends the brake instruction signal, which includes a predetermined target deceleration TG, to the brake ECU 30. When the brake instruction signal is received, the brake ECU 30 controls the brake actuator 32 so that the vehicle speed Vs is reduced by braking in such a way that the actual acceleration of the host vehicle SV matches the target deceleration TG included in the brake instruction signal. When sending the brake instruction signal, the CPU sends the torque reduction instruction signal to an engine ECU not shown. When the torque reduction instruction signal is received, the engine ECU drives the throttle valve actuator (not shown) to change the throttle valve opening degree to the minimum opening degree for changing the torque of the internal combustion engine to the minimum torque. When the host vehicle SV is a hybrid vehicle, the engine ECU can control the driving force of the host vehicle SV that is generated by either or both of the "internal combustion engine and the electric motor" provided as the vehicle driving source. Furthermore, when the host vehicle is an electric vehicle, the engine ECU can control the driving force of the host vehicle SV that is generated by the electric motor provided as the vehicle driving source. In addition, the CPU sends the preparation signal to the airbag actuator 36. When the preparation signal is received, the airbag actuator 36 causes the inflator to prepare for deploying the airbag.

On the other hand, if the time to collision TTCmin is larger than the first threshold time T1th, the CPU determines that the result of step 435 is "No" and the processing proceeds to step 445. In step 445, the CPU determines whether the time to collision TTCmin is larger than first threshold time T1th and is equal to or smaller than second threshold time T2th. The second threshold time T2th is set to a value larger than the first threshold time T1th.

If the time to collision TTCmin is larger than first threshold time T1th and is equal to or smaller than second threshold time T2th, the CPU determines that the result of step 445 is "Yes" and the processing proceeds to step 450. In step 450, the CPU performs the second pre-crash control, and the processing proceeds to step 495 to once terminate this routine. The second pre-crash control includes the alarm control and the braking control. The second pre-crash control is sometimes referred to as "Front Cross Traffic Alert (FCTA)". The alarm control is a control operation for displaying the "alert screen indicating that an object with collision probability is approaching" on the display 33 and for outputting the warning sound from the speaker 34. The target deceleration TG in the braking control of the second pre-crash control is set to a value smaller than the target deceleration TG in the braking control of the first pre-crash control. More specifically, the target deceleration TG in the brake control of the second pre-crash control is set to a comparatively small value to the extent that the driver feels that "the host vehicle SV is decelerating". On the other hand, the target deceleration TG in the braking control of the first pre-crash control is set to a relatively large value to the extent that the host vehicle SV can stop before colliding with the obstacle. Setting the target deceleration TG in this way makes it possible to decrease the probability that the driver feels annoying the braking control of the host vehicle SV when the second pre-crash control is performed and, in addition, to increase the probability that the host vehicle SV will stop before colliding with an obstacle by the braking control of the host vehicle SV when the first pre-crash control is performed.

On the other hand, if the time to collision TTCmin is larger than the second threshold time T2th, the CPU determines that the result of step 445 is "No", and the processing proceeds to step 495 to once terminate this routine. As a result, no pre-crash control is performed.

Figure 7:
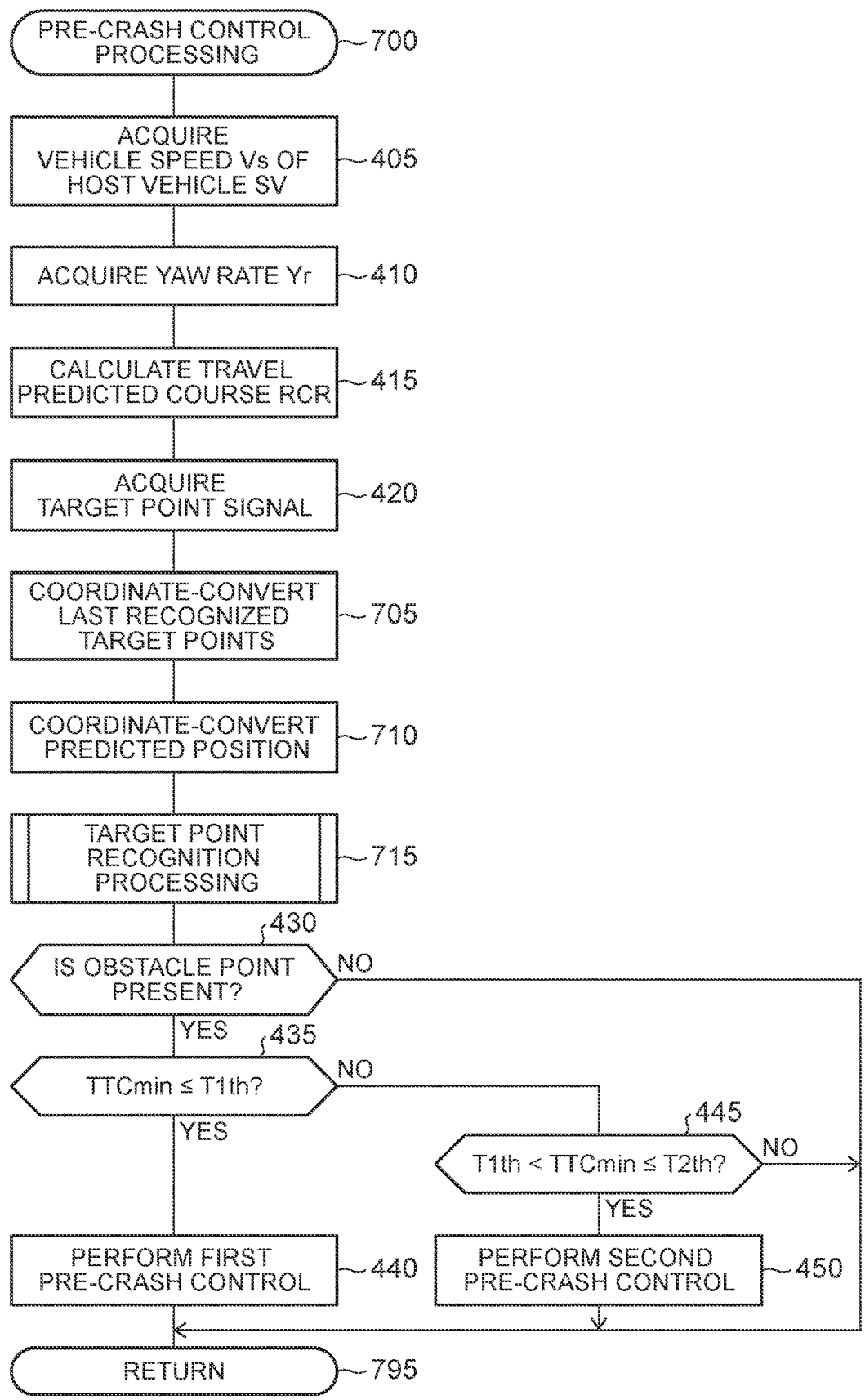
FIG. 7 is a flowchart showing a routine performed the CPU of the pre-crash control ECU shown in FIG. 1 for the second time and thereafter.

When the predetermined time (execution time T) has elapsed since the execution of the pre-crash control processing shown in FIG. 4, the CPU performs the pre-crash control processing shown in FIG. 7 each time the predetermined time elapses. The same processing as that in a step in FIG. 4 is performed in some of the steps in FIG. 7. For such a step, the same reference numeral as that of the corresponding step in FIG. 4 is used, and the detailed description of that step is omitted.

Therefore, when the time comes to perform the pre-cash control processing, the CPU starts processing in step 700 in FIG. 7, sequentially performs processing in the steps 405 to 420 described above and, after that, sequentially performs processing in step 705 to step 715.

Step 705: The CPU converts the coordinates of all the target points, recognized up to this point in time (that is, by the time control is passed to this routine for execution), to the coordinates in the current coordinate system. More specifically, the CPU calculates the distance over which the host vehicle SV has traveled from the last-acquired time point, which indicates the time when this routine was last executed, to the current time point along the "travel predicted course RCR calculated last". After that, the CPU subtracts the "calculated distance" from the "coordinates of the last-recognized target points in the last-used current target coordinate system" to convert the coordinates of all the last-recognized target points to the corresponding coordinates in the current coordinate system. Note that, when the last-calculated travel predicted course RCR indicates that the "host vehicle SV is turning", the CPU first performs rotational transformation so that the X axis and the Y axis in the "last-used current coordinate system" match the X axis and the Y axis in the "current coordinate system" and, after that, performs the above-described subtraction. Step 710: The CPU converts the coordinates of the predicted position of the target point predicted either in step 540 in FIG. 5 during the pre-crash control processing last performed or predicted in step 830 in FIG. 8, which will be described later, to the coordinates in the current coordinate system in the same manner as in step 705.

Step 715: Based on the position of the target point indicated by the target point signal acquired in step 420 in FIG. 7, the CPU performs the target point recognition processing for recognizing the position and speed of the target point. In the actual processing, when the processing proceeds to step 715, the CPU performs the subroutine shown in the flowchart in FIG. 8. The same processing as that in a step in FIG. 5 is performed in some of the steps in FIG. 8. For such a step, the same reference numeral as that of the corresponding step in FIG. 5 is used, and the detailed description of that step is omitted.

Figure 8:
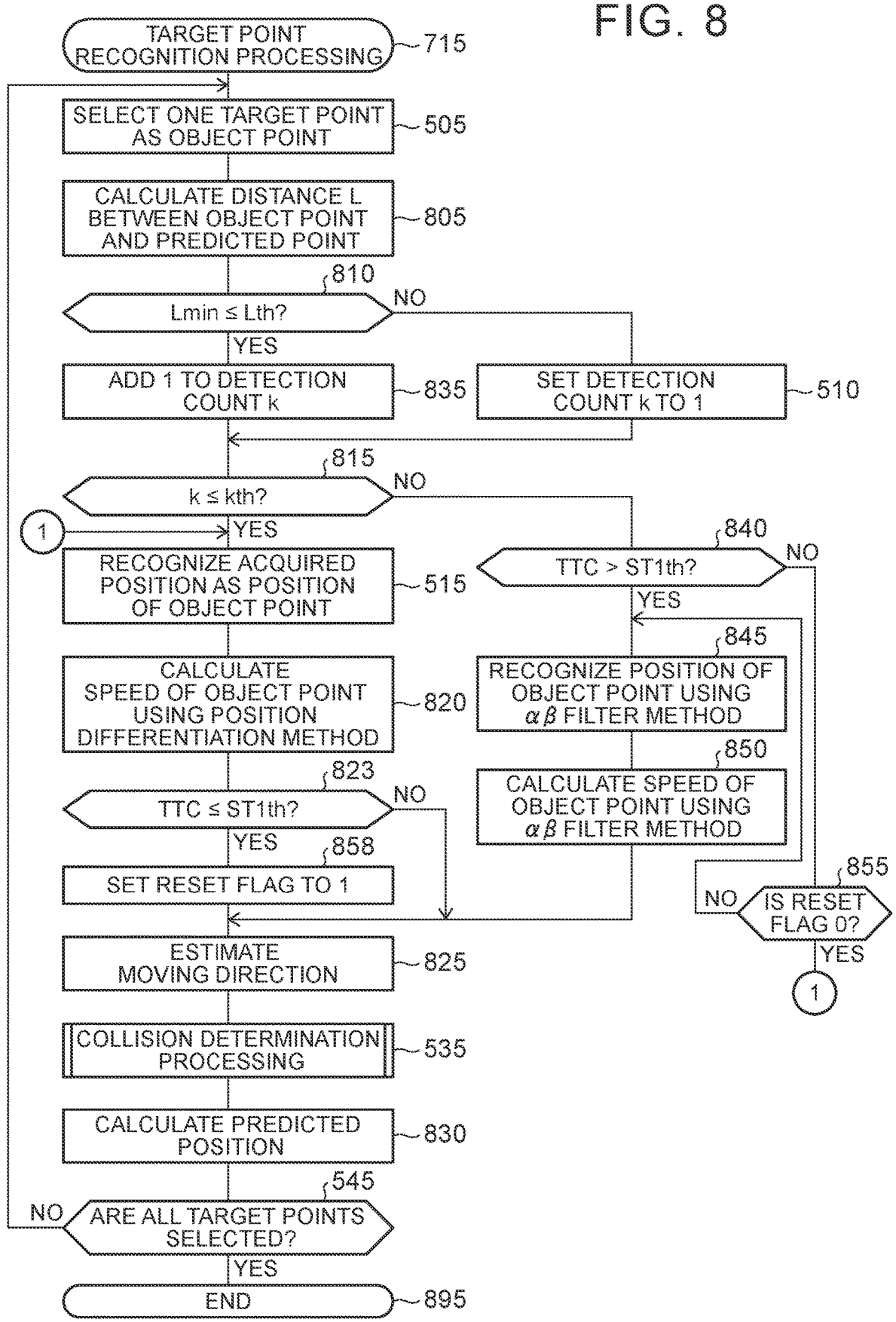
FIG. 8 is a flowchart showing a routine performed by the CPU of the pre-crash control ECU in the target point recognition processing performed by the routine shown in FIG. 7.

That is, when the processing proceeds to step 715, the CPU selects an object point in step 505 shown in FIG. 8, and the processing proceeds to step 805.

In step 805, the CPU calculates the distance L between the position of the object point, indicated by the target point signal (i.e., the acquired position), and each of the "position of the predicted point (predicted position)" calculated either in step 540 in FIG. 5 during the pre-crash control processing last executed or in step 830 in FIG. 8 that will be described later. Note that the coordinates of each predicted position are converted to the coordinates in the current coordinate system. After step 805, the processing proceeds to step 810 and the CPU determines whether "the minimum distance Lmin of the distances L calculated in step 805" is equal to or smaller than the threshold distance Lth.

If the minimum distance Lmin is larger than the threshold distance Lth, the CPU determines that the object point is not the same target point as an already detected target point but is a target point detected for the first time. In this case, the CPU determines that the result of step 810 is "No", the processing proceeds to step 510 shown in FIG. 8, the detection count k of the object point is set to 1, and then the processing proceeds to step 815. In step 510, the CPU assigns a unique identifier to the object point.

In step 815, the CPU determines whether the detection count k of the object point is equal to or smaller than the threshold count kth. If the detection count k of the object point is equal to or smaller than the threshold count kth, the CPU determines that the result of step 815 is "Yes" and, in this case, sequentially performs the processing in steps 515 and 820 described below (processing for recognizing the position and speed of the target point using the position differentiation method). After that, the processing proceeds to step 823 shown in FIG. 8. Note that the threshold count kth is preset to a natural number 2 or larger.

In step 515, the CPU recognizes the acquired position as the position of the object point, and the processing proceeds to step 820. In step 820, the CPU calculates the speed of the object point by dividing the distance from the last recognized position of the object point to the currently recognized position of the object point by the execution time T. Then, the CPU recognizes the calculated speed as the speed of the object point.

In actual calculation, the CPU calculates the speed of the object point separately for the X axis component and for the Y axis component. That is, the CPU calculates the speed of the object point (Vax (k), Vay (k)). As described above, the recognition of the position and speed of the object point in steps 515 and 820 shown in FIG. 8 is the "recognition of the position and speed of the object point using the position differentiation method" and the "recognition of the position and speed of the object point using the second method".

Next, the processing proceeds to step 823 shown in FIG. 8, and the CPU determines whether the time to collision TTC of the object point is equal to or smaller than the first threshold switching time ST1th.

If the time to collision TTC of the object point is larger than the first threshold switching time ST1th, the CPU determines that the result of step 823 is "No", and the processing proceeds to step 825. In step 825, the CPU estimates the future moving direction of the object point based on the history of the recognized position of the target point identified as being the same as the object point. Then, the processing proceeds to step 535 shown in FIG. 8.

Figure 9:
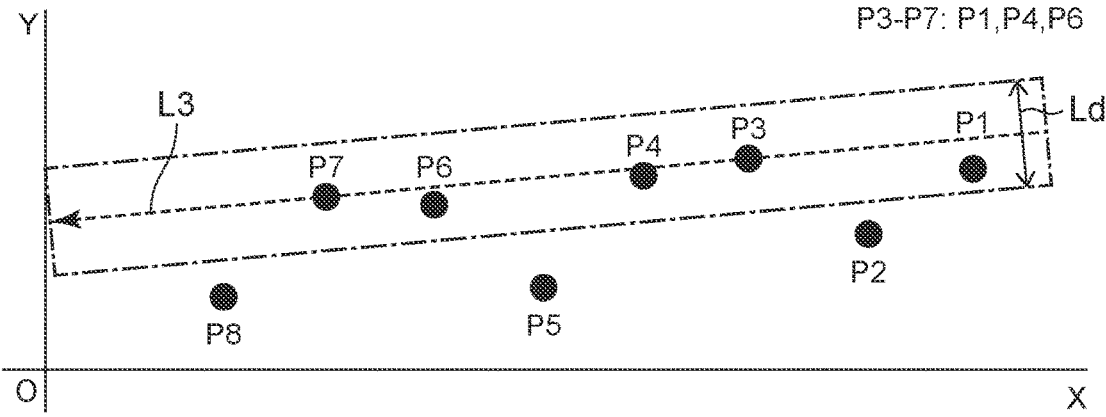
FIG. 9 is a diagram showing the estimation processing in the moving direction of a target point.

The detail of the processing in step 825 will be described with reference to FIG. 9. The CPU acquires a predetermined number of temporally new recognized positions (e.g., "8" in even number in this example) from the history of the recognized positions of the target point identified as being the same as the object point detected at the current time point. Then, from among the predetermined number of recognized position that have been acquired, the CPU pairs the latest recognized position with the "recognized position at the time point distant from the latest recognized position by the half ("4") of the predetermined number ("8"). In this manner, the CPU pairs the "recognized position" at a certain time point with "the recognized position at a time point distant from this time point back to the time corresponding to the half the predetermined number", and creates pairs among all the recognized positions that have been acquired. In the example shown in FIG. 9, recognized positions P1 to P8 are acquired. Recognized position P1 is the oldest, and recognized position P8 is the newest. Recognized position P1 and the recognized position P5 are paired, recognized position P2 and recognized position P6 are paired, recognized position P3 and recognized position P7 are paired, and recognized position P4 and recognized position P8 are paired. In addition, the CPU calculates straight lines passing through the two paired target points, one for each pair, and counts the number of target points each having a recognized position within a predetermined range from each of the calculated straight lines (the number of target points whose distance from each straight line is within the distance Ld). The CPU identifies a straight line having the maximum number of counted target points as a straight line indicating the moving direction of the object point. That is, the CPU estimates that the object point will move straight along the straight line identified in this way. In the example shown in FIG. 9, straight line L3 passing through recognized position P3 and recognized position P7 has the maximum number of recognized positions (P1, P4, P6) within the predetermined range from straight line L3. Therefore, the straight line L3 is identified as the moving direction.

Next, the processing proceeds to step 535 shown in FIG. 8, the CPU performs the collision determination processing, and the processing proceeds to step 830. Since this collision determination processing is the same as the collision determination processing described with reference to FIG. 6, the description will be omitted.

In step 830, the CPU calculates the predicted position, which is a position at which the object point is predicted to be located the next time this routine is performed, and stores the calculated predicted position, together with the identifier of the object point, in the RAM. At this time, if the position and speed of the object point are recognized by the position differentiation method, the CPU calculates, as the predicted position, the position that advances from the position of the object point, recognized in step 515 shown in FIG. 8, along the moving direction, estimated in step 825, by the "value calculated by multiplying the speed, calculated in step 820, by the execution time T".

Then, the processing proceeds to step 545 shown in FIG. 8, and the CPU determines whether all the target points, identified by the target point signal, are selected as an object point. If all the target points are not yet selected as an object point, the CPU determines that the result of step 545 shown in FIG. 8 is "No", the processing returns to step 505 shown in FIG. 8, and the CPU selects a target point that has not yet been selected as an object point. Then, the processing proceeds to step 805 and subsequent steps. On the other hand, if all the target points are already selected as an object point, the CPU determines that the result of step 545 shown in FIG. 8 is "Yes", and the processing proceeds to step 895 to once terminate this routine. Then, the processing proceeds to step 430 and subsequent steps shown in FIG. 7, and the processing proceeds to step 795 to once terminate this routine. The processing in step 430 and the subsequent steps shown in FIG. 7 is the same as the processing in step 430 and the subsequent steps shown in FIG. 4 and, therefore, the description will be omitted.

On the other hand, if the "minimum distance Lmin of the distances L calculated in step 805 shown in FIG. 8" is equal to or smaller than the threshold distance Lth, the object point selected in step 505 shown in FIG. 8 is considered to be the same target point as the target point corresponding to the predicted point with the minimum distance Lmin. In this case, the CPU determines that the result of step 810 is "Yes", and the processing proceeds to step 835. The CPU adds 1 to the detection count k of this target point, and the processing proceeds to the processing in step 815 and subsequent steps. In the present control device, the position and speed of the object point are recognized using the position differentiation method until the detection count k of the object point becomes larger than the threshold count kth (see step 815 and step 515 and step 820 in FIG. 8). In step 835, the CPU assigns, to the object point, the identifier that is assigned to the target point corresponding to the predicted point with the minimum distance Lmin.

If a target point identified as being the same is detected multiple times as described above and, each time such a target point is detected, 1 is added to the detection count k in step 835, the detection count k eventually becomes larger than the threshold count kth. In this case, when the processing proceeds to step 815, the CPU determines that the result of step 815 is "No" since the detection count k is larger than the threshold count kth and, in his case, the processing proceeds to step 840.

In step 840, the CPU determines whether the time to collision TTC of the object point is larger than the first threshold switching time ST1th. If the time to collision TTC of the object point is larger than the first threshold switching time ST1th, the CPU determines that the result of step 840 is "Yes" and the processing proceeds to step 845.

Figure 10:
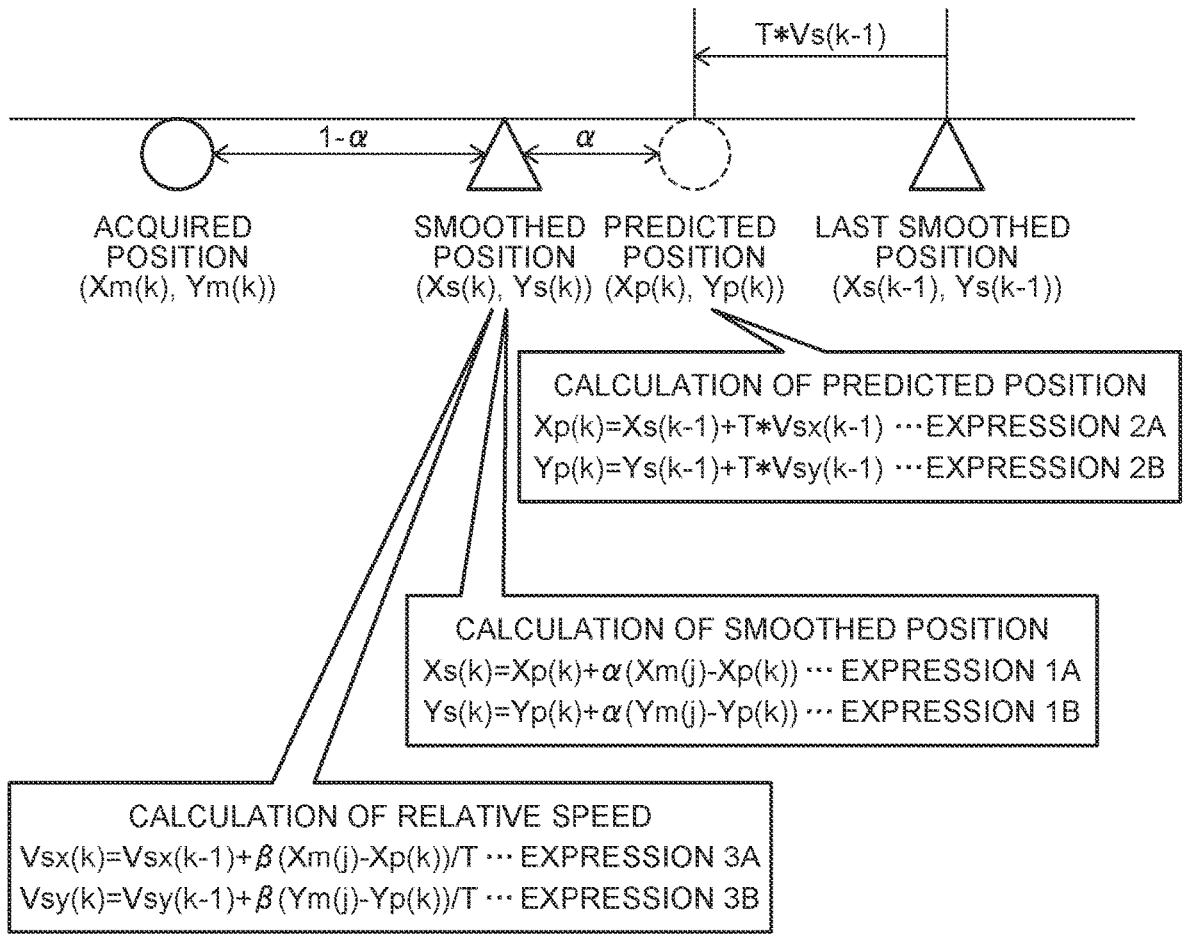
FIG. 10 is a diagram showing the recognition processing of the position of a target point using the $\alpha\beta$ filter method.

In step 845, the CPU recognizes the position of the object point using the αβ filter method. The processing for recognizing the position an object point using the αβ filter method is known (for example, see Japanese Patent Application Publication No. 2009-168624 (JP 2009-168624 A)). Therefore, the processing will be briefly described below with reference to FIG. 10. In the description below, the position and the speed are values after they are coordinate-converted to the current coordinate system. In addition, parenthesized k and j given to a variable indicate that the variable is the value obtained in the current (kth) calculation, and kz−1 indicates that the variable is the value obtained in the ((k−1)th) calculation that was performed last.

When the αβ filter method is used, the CPU substitutes the predicted position (Xp(k), Yp(k)) and the acquired position (Xm(j), Ym(j)) into expression 1A and expression 1B to calculate the smoothed position (Xs(k), Ys(k)) and recognizes the smoothed position as the position of the object point. That is, the smoothed position is acquired as the recognized position.

$Xs(k)=Xp(k)+\alpha(Xm(j)-Xp(k))$  Expression 1A $Ys(k)=Yp(k)+\alpha(Ym(j)-Yp(k))$  Expression 1B "α" is the weighting coefficient related to the "weighted average of predicted position and acquired position" and is preset to a predetermined value of 0 or larger and 1 or smaller. As "α" is set to a value closer to 0, the smoothed position is calculated at a position closer to the predicted position. As "α" is set to a value closer to 1, the smoothed position is calculated at a position closer to the acquired position.

At this point, the CPU substitutes the last recognized position (Xs(k−1), Y(k−1)) of the target point, identified as the same as the object point, and the last recognized speed of the target point (Vsx(k−1), Vsy(k−1) (hereinafter referred to as "last recognized speed") into expression 2A and expression 2B to calculate the predicted position (Xp(k), Yp(k)).

$Xp(k)=Xs(k-1)+T^*Vsx(k-1)$  Expression 2A $Yp(k)=Ys(k-1)+T^*Vsy(k-1)$  Expression 2B "T" is the execution time T described above. Therefore, the predicted position (Xp(k), Yp(k)) is the position moved from the last recognized position at the last recognized speed during the execution time T. That is, the predicted position is calculated on the premise that the object point performs the uniform linear motion from the last recognized position in the direction of the last recognized speed while maintaining the last recognized speed.

Note that when the position of an object point is recognized for the first time using the αβ filter method, the CPU uses the "recognized position of the target point identified as being the same as the object point", which was recognized using the position differentiation method when this routine was executed last, as the last recognized position. The position of the object point is recognized for the first time using the αβ filter method when the condition the "detection count k becomes larger than the threshold count kth and the time to collision TTC is larger than the first threshold switching time ST1th" is satisfied for the first time.

To summarize the above description, according to the αβ filter method, the position obtained by dividing the interval between the predicted position and the acquired position at the ratio of "1−α:α" (internally divided position) is calculated as the smoothed position, and the smoothed position, calculated in this way, is recognized as the position of the object point. That is, the smoothed position is calculated considering not only the acquired position but also the predicted position.

Next, the processing proceeds to step 850 shown in FIG. 8 and, in that step, the CPU calculates the speed of the object point using the αβ filter method. The processing for recognizing the speed of an object point using the αβ filter method is known (for example, see Japanese Patent Application Publication No. 2009-168624 (JP 2009-168624 A)). Therefore, this processing will be briefly described with reference to FIG. 10.

When the αβ filter method is used, the CPU substitutes the last recognized speed (Vsx(k−1), Vsy(k−1)), the acquired position (Xm(j), Ym(j)), and the predicted position (Xp(k),Yp(k)) into expression 3A and expression 3B to calculate the smoothed speed (Vsx(k), Vsy(k)).

$Vsx(k)=Vsx(k-1)+\beta[Xm(j)-Xp\ k)]/T$  Expression 3 A $Vsy(k)=Vsy(k-1)+\beta[Ym(j)-Yp(k)]/T$  Expression 3 B "β" is the weighting coefficient of "the residual speed calculated based on the residual between the acquired position and the predicted position" that is added to the last recognized speed. "β" is a value, equal to or larger than 0 and equal to or smaller than 1, that changes according to the detection count k. As "β" is closer to 0, the ratio of the residual speed added to the last recognized speed decreases and, therefore, the smoothed speed becomes a value closer to the value of the last recognized speed. On the other hand, as "β" is closer to 1, the ratio of the residual speed added to the last recognized speed increases and, therefore, the smoothed speed becomes a value further away from the value of the last recognized speed. That is, as "β" is closer to 1, the direction of the smoothed speed tends to be corrected to a value closer to the acquired position side than the that of the last recognized speed.

The CPU substitutes the detection count m into expression 4 to calculate the weighting coefficient β.

$$\beta = (0.145 \times (15-m) + 0.04 \times m) \div 15 \qquad \text{Expression 4}$$

According to expression 4, the weighting coefficient β decreases as the detection count m increases. In this example, when the detection count m is 15 or larger, the weighting factor β is maintained at 0.04.

Note that, when the position of an object point is recognized for the first time using the αβ filter method, the CPU uses the "recognized speed of the target point identified as being the same as the object point", which was recognized using the position differentiation method when this routine was executed last, as the last recognized speed.

Next, the processing proceeds to step 825 and the CPU estimates the moving direction of the object point as described above, based on the history of the recognized position of the target point identified as being the same as the object point. Next, the processing of the CPU proceeds to the processing in step 535 and subsequent steps shown in FIG. 8.

According to the αβ filter method, the time-series variation in the "moving direction of the target point indicated by the recognized position of the target point" with respect to the "correct moving direction of the position of the target point" becomes smaller than that in the position differentiation method as described above. This means that the moving direction estimated based on the history of the recognized position using the αβ filter method is more stable chronologically, and more accurate, than the moving direction estimated based on the history of the recognized position using the position differentiation method.

In step 830 performed after steps 845 and 850, the CPU substitutes the position of the object point recognized in step 845, and the speed of the object point recognized in step 850, into expression 2A and expression 2B to calculate the predicted position.

On the other hand, if the time to collision TTC of the object point is equal to or smaller than the first threshold switching time ST1th when the processing of the CPU proceeds to step 840, the CPU determines that the result of step 840 is "No" and the processing proceeds to step 855. In step 855, the CPU determines whether the value of the reset flag of the object point is 0. The reset flag is provided for each of the detected target points that have already been detected. The reset flag value of 1 indicates that the recognition processing for the target point using the position differentiation method was performed after the time to collision TTC of the target point became equal to or smaller than first the threshold switching time ST1th. On the other hand, the reset flag value of 0 indicates that the recognition processing for the target point using the position differentiation method is not yet performed after the time to collision TTC of the target point becomes equal to or smaller than the first threshold switching time ST1th.

If the value of the reset flag is 0, that is, if the recognition processing for the target point using the position differentiation method is not yet performed after the time to collision TTC of the target point becomes equal to or smaller than the first threshold switching time ST1th, the CPU determines that the result of step 855 is "Yes" and the processing proceeds to step 515 shown in FIG. 8 to recognize the acquired position directly as the position of the object point. Next, the processing proceeds to step 820, the CPU calculates the speed of the object point using the position differentiation method, and then the processing proceeds to step 823.

At this point, the time to collision TTC of the object point is equal to or smaller than the first threshold switching time ST1th as described above. Therefore, the CPU determines that the result of step 823 shown in FIG. 8 is "Yes" and the processing proceeds to step 858 to set the value of the reset flag of the object point to 1. After that, the CPU performs the processing in step 825 and the subsequent steps.

If the value of the reset flag is set to 1 in step 858 shown in FIG. 8, that is, if the recognition processing for the target point using the position differentiation method was performed after the time to collision TTC of the target point became equal to or smaller than the first threshold switching time ST1th and the processing of the CPU proceeds to step 855, the CPU determines that the result of step 855 is "No". Then, the processing of the CPU proceeds to the processing in step 845 and the subsequent steps, recognizes the position of the object point and the speed of the object point using the αβ filter method, and performs the processing in step 825 and the subsequent steps.

Therefore, from the time the detection count k of the target point identified as being the same becomes larger than the threshold count kth (step 815: No) to the time the time to collision TTC of the target point becomes equal to or smaller than the first threshold switching time ST1th, the CPU recognizes the position and speed of the target point using the αβ filter method (steps 845 and 850). However, as the number of recognitions of the position and speed using the αβ filter method increases, there is a probability that the deviation of the recognized position (smoothed position) from the acquired position increases. Therefore, when the time to collision TTC of the target point becomes equal to or smaller than the first threshold switching time ST1th (step 840: No), the CPU once recognizes the position and speed of the target point using the position differentiation method (step 855: Yes, steps 515 and 820 shown in FIG. 8). Then, after that, the CPU recognizes the position and speed of the target point using the αβ filter method (step 855: No, step 845 and step 850). Recognizing the position and speed of the target point once using the position differentiation method in this way makes it possible to reset the above-described deviation of the recognized position from the acquired position. Furthermore, when the time to collision TTC of the target point becomes equal to or smaller than the first threshold switching time ST1th, there is a high probability that the distance from the target point to the millimeter wave radar 21 becomes relatively short and the acquired position accurately indicates the actual position of the target point. Therefore, when the time to collision TTC becomes equal to or smaller than the first threshold switching time ST1th, the recognized position can be set to the acquired position that is highly likely to indicate the actual position of the target point. Thus, the above-described processing performed by the present control device allows the position of a target point to be recognized accurately, increasing the accuracy in collision determination. As a result, the present control device can reduce the probability that an unnecessary pre-crash control operation is erroneously performed and the probability that a necessary pre-crash control operation is not erroneously performed.

Modification

The present control device described above once stops the recognition of the position of an object point using the αβ filter method when the time to collision TTC becomes equal to or smaller than the first threshold switching time ST1th and recognizes the acquired position as the position of the object point. Therefore, when the position of the object point recognized by the αβ filter method is changed to the acquired position, the recognized position of the object point may change greatly from the last recognized position. To address this problem, the control device in this modification differs from the control device described above only in that, from the time when the time to collision TTC becomes equal to or smaller than the "second threshold switching time ST2th larger than the first threshold switching time ST1th" to the time when the time to collision TTC becomes equal to or smaller than the first threshold switching time ST1th, the recognized position is brought gradually closer to the acquired position to prevent a sudden change in the recognized position. The following describes this modification with focus on this difference.

Figure 11:
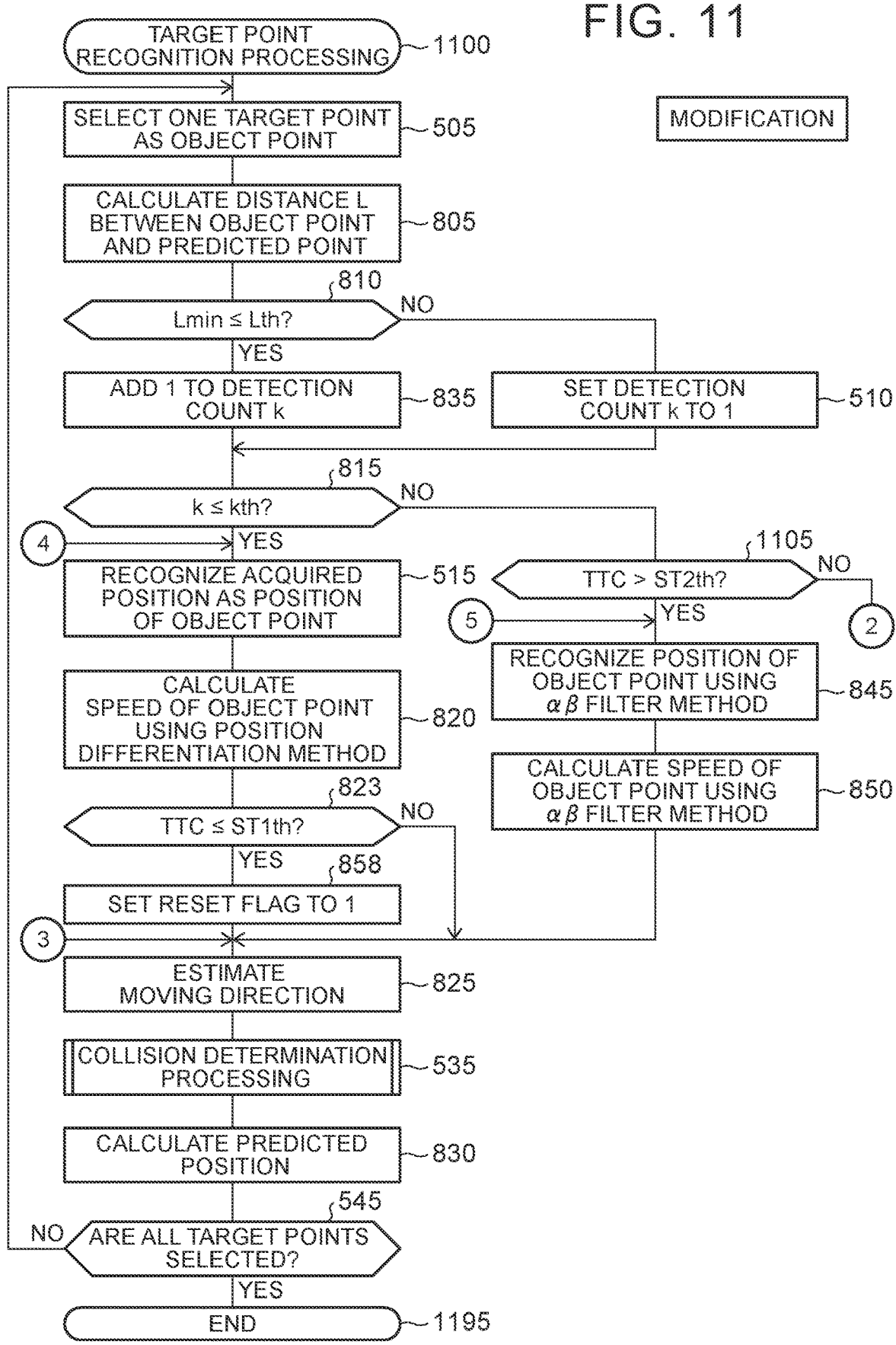
FIG. 11 is a flowchart showing the first half of the routine of the target point recognition processing performed by the CPU of the pre-crash control ECU in a modification of the present control device for the second time and thereafter.
Figure 12:
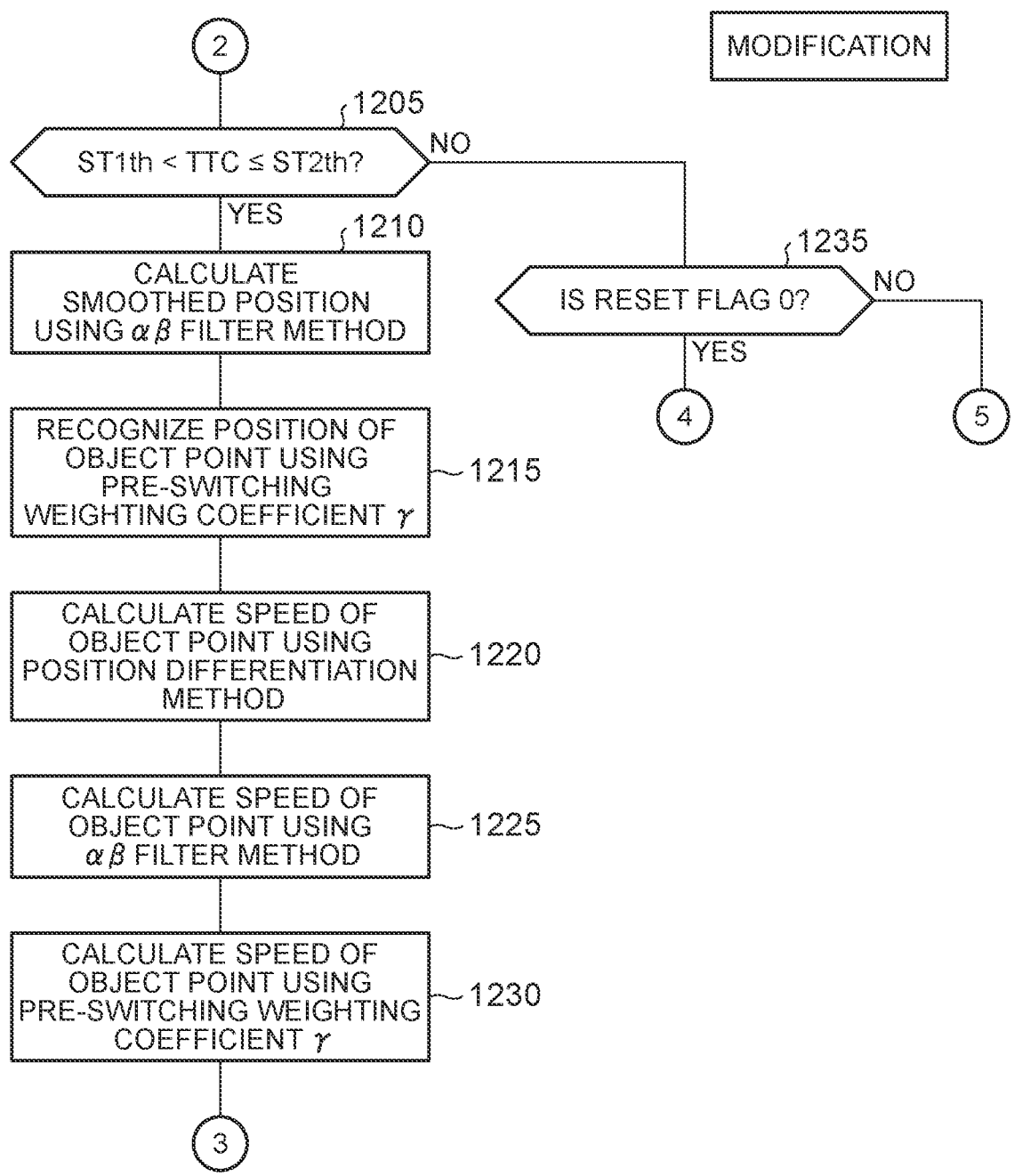
FIG. 12 is a flowchart showing the second half of the routine of the target point recognition processing performed by the CPU of the pre-crash control ECU in a modification of the present control device.

The CPU of a pre-crash control ECU 10 of this modification performs the routine, shown by the flowcharts in FIG. 11 and FIG. 12, instead of the routine shown in the flowchart of FIG. 8 each time a predetermined time elapses. The same processing as that in a step in FIG. 8 is performed in some of the steps in FIG. 11. For such a step, the same reference numeral as that of the corresponding step in FIG. 8 is used, and the detailed description of that step is omitted.

Therefore, when the proceeding proceeds to step 715 shown in FIG. 7, the CPU starts processing in step 1100 in FIG. 11. If the detection count k is larger than the threshold count kth when the processing proceeds to step 815, the CPU determines that the result of step 815 is "No" and the processing proceeds to step 1105.

In step 1105, the CPU determines whether the time to collision TTC of the object point is larger than the second threshold switching time ST2th. The second threshold switching time ST2th is set to a value larger than the first threshold switching time ST1th.

If the time to collision TTC of the object point is larger than the second threshold switching time ST2th, the CPU determines that the result of step 1105 is "Yes" and the processing proceeds to the processing in step 845 and the subsequent steps shown in FIG. 11. On the other hand, if the time to collision TTC of the object point is equal to or smaller than the second threshold switching time ST2th, the CPU determines that the result of step 1105 is "No" and the processing proceeds to step 1205 shown in FIG. 12.

In step 1205, the CPU determines whether the time to collision TTC of the object point is larger than the first threshold switching time ST1th and is equal to or smaller than the second threshold switching time ST2th.

If the time to collision TTC of the object point is larger than the first threshold switching time ST1th and is equal to or smaller than the second threshold switching time ST2th, the CPU determines that the result of step 1205 is "Yes" and sequentially performs the processing in steps 1210 to 1230. After that, the processing of the CPU proceeds to the processing in step 825 and the subsequent steps shown in FIG. 11 and, if it is determined that the result of step 545 shown in FIG. 11 is "Yes", the processing proceeds to step 1195 to once terminate this routine.

Step 1210: The CPU calculates the smoothed position (Xs(k), Ys(k)) using the αβ filter method (that is, according to expression 1A and expression 1B) as in step 845 shown in FIG. 8 and FIG. 11. Step 1215: The CPU applies the time to collision TTC of the object point to a pre-switching weighting coefficient table (not shown) to obtain the pre-switching weighting coefficient α corresponding to the time to collision TTC. In addition, the CPU substitutes the acquired pre-switching weighting coefficient γ, smoothed position (Xs(k), Ys(k)), and the acquired position (Xm(j), Ym(j)) into expression 5A and expression 5B to recognize the position (Xr(k), Yr(k)) of the object point.

$$Xr(k)=\gamma Xs(k)+(1-\gamma)Xm(j) \qquad \text{Expression 5 A}$$

$$Yr(k)=\gamma Ys(k)+(1-\gamma)Ym(j) \qquad \text{expression 5 B}$$

"γ", a value of 0 or larger and 1 or smaller, is a weighting coefficient concerning the "weighted average of the smoothed position and the acquired point". The closer "γ" is to 0, the closer the recognized position is to the acquired position. The closer 'γ' is to 1, the closer the recognized position is to the smoothed position.

The pre-switching weighting coefficient table defines the relationship between the time to collision TTC that is larger than first threshold switching time ST1th and is equal to or smaller than the second threshold switching time ST2th and the pre-switching weighting coefficient γ. More specifically, according to the pre-switching weighting coefficient table, the pre-switching weighting coefficient γ is determined in such a way that the pre-switching weighting coefficient γ becomes a smaller value as the time to collision TTC decreases. Thus, as the time to collision TTC becomes closer to the first threshold switching time ST1th, the recognized position becomes closer to the acquired position and farther from the smoothed position. The recognized position is brought gradually closer to the acquired position using expression 5A and expression 5B from the time when the time to collision TTC becomes equal to or smaller than the second threshold switching time ST2th. This prevents a sudden change in the recognized position when the time to collision TTC becomes equal to or smaller than the first threshold switching time ST1th.

Step 1220: The CPU calculates the speed of the object point (Vax(k), Vay(k)) using the position differentiation method in the same way as in step 820 shown in FIG. 8 and FIG. 12. Step 1225: The CPU calculates the speed of the object point (Vsx(k), Vsy(k)) using the αβ filter method in the same way as in step 850 shown in FIG. 8 and FIG. 11. Step 1230: The CPU substitutes the pre-switching weighting coefficient α acquired in step 1215, the speed (Vax(k), Vay(k)) calculated in step 1220, and the speed (Vsx(k), Vsy(k)) calculated in step 1225 into expression 6A and expression 6B to calculate the speed of the object point (Vrx(k), Vry(k)).

$$Vrx(k)=\gamma Vsx(k)+(1-\gamma)Vax(k) \qquad \text{Expression 6 A}$$

$$Vry(k)=\gamma Vsy(k)+(1-\gamma)Vay(k) \qquad \text{Expression 6B}$$

As "γ" is closer to 0, the speed of the object point (Vrx(k), Vry(k)) becomes closer to the "speed of the object point (Vax(k), Vay(k)) calculated using the position differentiation method". As "γ" is closer to 1, the speed of the object point (Vrx(k), Vry(k)) becomes closer to the "speed of the object point (Vsx(k), Vsy(k)) calculated using the αβ filter method".

Thus, as the time to collision TTC becomes closer to the first threshold switching time ST1th, the recognized speed becomes closer to the speed calculated using position differentiation method. Therefore, when the recognized speed of the object point is switched to the speed calculated using position differentiation method at the time when the time to collision TTC becomes equal to or smaller than the first threshold switching time ST1th, the processing described above can prevent the recognized speed from being changed suddenly from the last recognized speed.

After the processing in step 1230 is performed, the processing of the CPU proceeds to the processing in step 825 and the subsequent steps shown in FIG. 11. In step 830 performed in this case, the CPU substitutes the position of the object point, recognized in step 1215 shown in FIG. 12, and the speed of the object point, recognized in step 1230 shown in FIG. 12, into the expression 2A and expression 2B to calculate the predicted position.

On the other hand, if the time to collision TTC of the object point is equal to or smaller than the first threshold switching time ST1th when the processing proceeds to step 1205 shown in FIG. 12, the CPU determines that the result of step 1205 is "No" and the processing proceeds to step 1235.

In step 1235, the CPU determines whether the value of the reset flag of the object point is 0. If the value of the reset flag is 0, the CPU determines that the result of step 1235 is "Yes", the processing proceeds to step 515 shown in FIG. 11, and the CPU recognizes the acquired position directly as the position of the object point. Next, the processing proceeds to step 820 shown in FIG. 11, the CPU calculates the speed of the object point using the position differentiation method, and the processing proceeds to the processing in step 823 and the subsequent steps shown in FIG. 11.

If the value of the reset flag is set to 1 in step 858 shown in FIG. 11, the CPU determines that the result of step 1235 is "No" when the processing proceeds to step 1235 shown in FIG. 12. The processing to step 845 shown in FIG. 11, and the CPU recognizes the position of the object point using the $\alpha\beta$ filter method. In addition, the processing proceeds to step 850 shown in FIG. 11, and the CPU calculates the speed of the object point using the $\alpha\beta$ filter method and then performs the processing in step 825 and the subsequent processing shown in FIG. 11.

As will be understood from the description of the above example, the recognized position is brought gradually closer to the acquired position from the time when the time to collision TTC becomes equal to or smaller than the second threshold switching time ST2th to the time when the time to collision TTC becomes equal to or smaller than the first threshold switching time ST1th. Therefore, the processing in this example prevents a sudden change in the recognized position when the time to collision TTC becomes equal to or smaller than the first threshold switching time ST1th.

The present disclosure is not limited to the above-described embodiments, but various modifications of the present disclosure are possible. For example, the first threshold switching time ST1th, though assumed to be set to a value larger than the first threshold time T1th in the description in FIG. 3, may be set to a value within a predetermined range from the first threshold time T1th. That is, the first threshold switching time ST1th may be set to a value smaller than, or the same value as, the first threshold time T1th as long as the value is within the predetermined range from the first threshold time T1th.

Furthermore, in step 825 shown in FIG. 8 and FIG. 11, the CPU may estimate the moving direction of the object point based on the history of the recognized position of the target point, identified as being the same as the object point, using the least squares method.

Furthermore, when the radar ECU 20 performs the processing similar to that in steps 805 and 810 shown in FIG. 8 and FIG. 11 and if there is a past target point identified as being the same as the target point included in the radar signal currently acquired by the radar ECU 20, the same identifier as that of the past target point may be assigned to the target point included in the currently acquired target point and the target point signal including that identifier may be sent to the pre-crash control ECU 10. In this case, the pre-crash control ECU 10 does not perform step 805 and step 810. In this case, if the identifier assigned to the object point was assigned in the past, the processing proceeds to a step 835 to add 1 to the detection count k. If the identifier assigned to the object point was not assigned in the past, the processing proceeds to step 510 to set the detection count k to 1.

Furthermore, even after the time to collision TTC of the object point becomes equal to or smaller than the first threshold switching time ST1th and the CPU once recognizes the position and speed of the object point using the position differentiation method, the CPU may continue to recognize the position and speed of the object point using the position differentiation method. When the time to collision TTC becomes equal to or smaller than the first threshold switching time ST1th, the distance from the object point to the millimeter wave radar 21 becomes relatively short and, thus, the error of the acquired position with respect to the actual position becomes small. Therefore, the moving direction of the object point indicated by the acquired position will be unlikely to vary chronologically with respect to the correct moving direction position of the object point. Therefore, even if the position and speed of the object point are recognized using the position differentiation method after the time to collision TTC becomes equal to or smaller than the first threshold switching time ST1th, it is possible to prevent a decrease in the accuracy of the collision determination. This reduces the probability that unnecessary pre-crash control will be performed and the probability that necessary pre-crash control will not be performed.

Furthermore, the sensor for detecting a target is not limited to the millimeter wave radar 21, and any sensor that sends the wireless medium and then receives the reflected wireless medium may be used. For this reason, instead of the millimeter wave radar 21, an infrared radar and a sonar radar may be used. Furthermore, the sensor for detecting a target may be a camera that photographs the scenery of the surrounding area of the host vehicle SV.

Furthermore, a part of the above-described processing executed by the pre-crash control device may be executed by another computer. In this case, the pre-crash control device receives the execution result in another computer and, based on the execution result, continues the processing.

What is claimed is:

1. A pre-crash control device comprising:
   a plurality of wave radars each connected to a radar electronic control unit (radar ECU) that includes a first processor for executing instructions stored in a first non-transitory memory in order to implement various functions of the pre-crash control device,
   the radar ECU configured to acquire target information based on data received from the plurality of wave radars,
   a pre-crash electronic control unit (pre-crash ECU) having a second processor for executing instructions stored in a second non-transitory memory in order to implement the various functions of the pre-crash control device, the pre-crash ECU being configured to estimate the moving direction of a target based on history of a recognized position, the pre-crash ECU being configured to determine a collision probability based on the recognized position and the moving direction, the collision probability being a probability that the target collides with a host vehicle, the pre-crash ECU being configured to perform pre-crash control in order to avoid collision with the target when the pre-crash ECU determines that a time to collision becomes equal to or smaller than a predetermined first threshold switching time, the time to collision being a time for the target to collide with the host vehicle, the pre-crash ECU being configured to estimate a currently predicted position of the target based on the recognized position last updated, when the time to collision is greater than the predetermined first threshold switching time, the pre-crash ECU being configured to update the recognized position each time the target information is newly acquired, wherein the recognized position is based on the currently predicted position and an acquired position, and wherein the acquired position is a position of the target identified by the target information that is newly acquired, and the pre-crash ECU being configured to update the recognized position to the acquired position, each time the target information is newly acquired, when the time to collision becomes equal to or smaller than the predetermined first threshold switching time.

2. The pre-crash control device according to claim 1, wherein
the pre-crash ECU is configured to update the recognized position based on the predicted position and the acquired position, and when the time to collision of the target becomes equal to or smaller than the predetermined first threshold switching time and the target information is newly acquired, the the recognized position is updated to the acquired position.

3. The pre-crash control device according to claim 1, further comprising
a wheel speed sensor configured to detect a vehicle speed of the host vehicle, and wherein
the pre-crash ECU is configured to update a recognized speed each time the target information is newly acquired, based on the recognized speed and on a speed based on a difference between the acquired position and the predicted position, the recognized speed being a last updated speed of the target, and
the pre-crash ECU is configured to determine whether there is the probability that the target collides with the host vehicle based on a difference between a first time and a second time, the first time being a time required for the host vehicle to arrive at a collision predicted intersection point when the host vehicle travels along a predicted course predicted along which the host vehicle is to travel at a vehicle speed detected by the wheel speed sensor, the collision predicted intersection point being an intersection point between an estimated course extending from the recognized position in the moving direction and the predicted course, the second time being a time required for the target to arrive at the collision predicted intersection point from the recognized position when the target moves along the moving direction at the recognized speed.

4. A control method of a pre-crash control device, the pre-crash control device including a pre-crash electronic control unit (pre-crash ECU) having a first processor for executing instructions stored in a non-transitory memory in order to implement various functions of the pre-crash control device, the pre-crash control device further including a plurality of wave radars each connected to a radar electronic control unit (radar ECU) that includes a second processor for executing instructions stored in a second non-transitory memory in order to implement the various functions of the pre-crash ECU, the radar ECU configured to acquire target information based on data received from the plurality of wave radars;

the control method comprising the steps of:

acquiring, by the plurality of wave radars, the target information, the radar ECU configured to identify a position of a target with respect to a host vehicle each time a predetermined time elapses;

estimating, by the pre-crash ECU, a moving direction of the target based on history of a recognized position, determining, by the pre-crash ECU, a collision probability based on the recognized position and the moving direction, the collision probability being a probability that the target collides with the host vehicle; and performing, by the pre-crash ECU, pre-crash control in order to avoid collision with the target when the electric control unit determines that a time to collision becomes equal to or smaller than a predetermined first threshold switching time and the time to collision being a time for the target to collide with the host vehicle, and when the time to collision is greater than the predetermined first threshold switching time, updating the recognized position, each time the target information is newly acquired, wherein the recognized position is based on the currently predicted position and an acquired position, and wherein the acquired position is a position of the target identified by the target information that is newly acquired, and updating the recognized position to the acquired position, each time the target information is newly acquired, when the time to collision becomes equal to or smaller than the predetermined first threshold switching time.

* * * * *